United States Patent
Maeda et al.

(10) Patent No.: US 8,590,680 B2
(45) Date of Patent: Nov. 26, 2013

(54) SHOCK ABSORBER

(75) Inventors: Atsushi Maeda, Fujisawa (JP); Masaru Kouyama, Ayase (JP); Mikio Yamashita, Yokohama (JP); Fumiyuki Yamaoka, Sagamihara (JP)

(73) Assignee: Hitachi Automotive Systems, Ltd., Hitachinaka-Shi (JP)

( * ) Notice: Subject to any disclaimer, the term of this patent is extended or adjusted under 35 U.S.C. 154(b) by 210 days.

(21) Appl. No.: 13/036,598

(22) Filed: Feb. 28, 2011

(65) Prior Publication Data

US 2011/0214955 A1 Sep. 8, 2011

(30) Foreign Application Priority Data

Mar. 3, 2010 (JP) .............................. P2010-047055
Dec. 28, 2010 (JP) .............................. P2010-292388

(51) Int. Cl.
*F16F 9/34* (2006.01)

(52) U.S. Cl.
USPC ............... 188/322.15; 188/322.22; 188/282.8

(58) Field of Classification Search
USPC ............. 188/275, 280, 282.1–282.8, 322.15, 188/322.22
See application file for complete search history.

(56) References Cited

U.S. PATENT DOCUMENTS

| | | | | |
|---|---|---|---|---|
| 5,129,488 A * | 7/1992 | Furuya et al. | ............... | 188/282.6 |
| 5,248,014 A * | 9/1993 | Ashiba | ......... | 188/282.8 |
| 5,386,892 A * | 2/1995 | Ashiba | ......... | 188/282.8 |
| 6,220,409 B1 * | 4/2001 | Deferme | .................. | 188/322.15 |
| 7,721,856 B2 * | 5/2010 | Goetz et al. | ................ | 188/282.6 |
| 8,028,813 B2 * | 10/2011 | Kim | .......... | 188/322.22 |
| 2004/0149530 A1* | 8/2004 | Drees | ........ | 188/322.15 |
| 2005/0263363 A1* | 12/2005 | Katou et al. | ............. | 188/322.22 |
| 2007/0125610 A1* | 6/2007 | Goetz et al. | ................ | 188/282.1 |
| 2010/0012451 A1* | 1/2010 | Ji et al. | ............ | 188/313 |
| 2011/0214953 A1* | 9/2011 | Maeda et al. | .................. | 188/266 |
| 2012/0312648 A1* | 12/2012 | Yu et al. | ........... | 188/280 |

FOREIGN PATENT DOCUMENTS

| | | |
|---|---|---|
| JP | 07-019642 | 1/1995 |
| JP | 2006-010069 | 1/2006 |

* cited by examiner

*Primary Examiner* — Christopher Schwartz
(74) *Attorney, Agent, or Firm* — Nixon & Vanderhye P.C.

(57) ABSTRACT

A shock absorber includes a first passage and a second passage to which a working fluid flows out from one chamber in a cylinder by movement of a piston, a damping valve installed on the first passage and configured to regulate a flow of the working fluid caused by sliding of the piston to generate a damping force, a back pressure chamber applying an internal pressure to the damping valve in a closing direction of the damping valve, a back pressure chamber inflow oil passage introducing the working fluid from one chamber into the back pressure chamber, a pressure chamber provided in-between on the second passage, and a free piston installed in the pressure chamber so as to freely slide in the pressure chamber.

18 Claims, 10 Drawing Sheets

SHOCK ABSORBER

BACKGROUND OF THE INVENTION

1. Field of the Invention

The present invention relates to a shock absorber.

This application claims priority to and the benefits of Japanese Patent Application Nos. 2010-047055 filed on Mar. 3, 2010, and 2010-292388 filed on Dec. 28, 2010, the disclosures of which are incorporated herein by reference.

2. Description of Related Art

In some shock absorbers, a damping force characteristic varies in response to a vibrating state (e.g. see Japanese Unexamined Utility Model Application, First Publication No. H07-019642, and Japanese Unexamined Patent Application, First Publication No. 2006-010069).

In general, shock absorbers are required to properly control a damping force in response to various vibrating states according to road surface conditions.

SUMMARY OF THE INVENTION

The present invention is directed to provide a shock absorber capable of properly controlling a damping force in response to various vibrating states.

According to a first aspect of the present invention, a shock absorber includes: first and second passages to which a working fluid flows out from one of chambers of an interior of a cylinder by movement of a piston; a damping valve installed on the first passage and configured to regulate a flow of the working fluid caused by sliding of the piston to generate a damping force; a back pressure chamber applying an internal pressure to the damping valve in a closing direction of the damping valve; a back pressure chamber inflow oil passage introducing the working fluid from the one of the chambers of the interior of the cylinder into the back pressure chamber; a pressure chamber provided on the second passage; and a free piston movably installed in the pressure chamber.

According to a second aspect of the present invention, a shock absorber includes: first and second passages to which a working fluid flows out from one of chambers of an interior of a cylinder by movement of a piston; a damping valve installed on the first passage and configured to regulate a flow of the working fluid caused by sliding of the piston to generate a damping force; a back pressure chamber applying an internal pressure to the damping valve in a closing direction of the damping valve; a back pressure chamber inflow oil passage introducing the working fluid from the one of the chambers of the interior of the cylinder into the back pressure chamber; a housing in which a flow passage corresponding to at least a part of the second passage is formed; a free piston movably installed in the housing and configured to partition the second passage into an upstream side and a downstream side; and one or a plurality of elastic bodies interposed between the free piston and the housing. At least one of a free piston contact surface of the free piston with which the elastic body is in contact and a housing contact surface of the housing with which the elastic body is in contact includes an inclined surface that is inclined to a moving direction of the free piston, and a shortest distance between a portion that is in contact with the elastic body within the free piston contact surface and a portion that is in contact with the elastic body within the housing contact surface is changed by movement of the free piston.

According to the aspects of the present invention, the shock absorber can suitably control the damping force according to various vibration states.

DETAILED DESCRIPTION OF THE INVENTION

Figure 1:
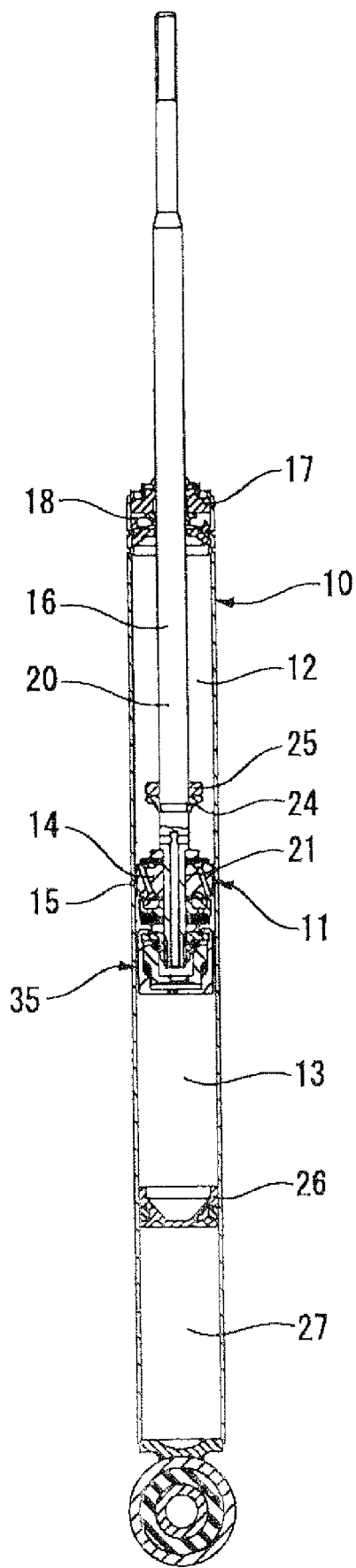
FIG. 1 is a cross-sectional view showing a shock absorber according to a first embodiment of the present invention.

Embodiments described below are not limited to the content described in the section entitled "Summary of the Invention," and solve various problems to produce effects. Main problems to be solved by the following embodiments are enumerated below including the content described in the section entitled "Summary of the Invention,"

[Improvement of characteristics] When changing a damping force characteristic (a damping force relative to a piston speed) in response to a vibrating state, characteristic setting including more smoothly changing the damping force characteristic is required. This is based on the following reasons. When a characteristic of generating a low damping force and a characteristic of generating a high damping force are abruptly switched, a damping force actually generated is also switched abruptly. For this reason, a ride comfort of a vehicle is degraded. Especially, when the switching of the damping force occurs during steering of the vehicle, the movement of the vehicle becomes unstable, and there is a possibility of causing discomfort to a driver in steering. Thus, as disclosed in Japanese Unexamined Utility Model Application, First Publication No. H07-019642, the characteristic setting of more smoothly changing is reviewed, but additional characteristic improvement is desired.

[Restraint of increase in size] As disclosed in Japanese Unexamined Utility Model Application, First Publication No. H07-019642, a variety of cylinder apparatuses, in which improvement is attempted such that a damping force characteristic covering a wide range of vibration frequencies is obtained, have been developed in such a way that to install a free piston on the side of one end of the piston and moving up and down in a housing is provided, in addition to a piston that partitions the interior of a cylinder into two chambers and has a mechanism for generating a damping force. Thereby, a damping force characteristic covering a wide range of vibration frequencies is obtained in the cylinder apparatuses. An increase in axial length is cited as a problem that these cylinder apparatuses have in common, because a region where the free piston moves up and down is needed. When the cylinder apparatus is enlarged, a degree of mounting freedom for a vehicle body is reduced. For this reason, the increase of the axial length of the cylinder apparatus is a major problem.

[Reduction in number of components] As disclosed in Japanese Unexamined Utility Model Application, First Publication No, H07-019642, since components such as a housing or a free piston are provided in addition to a piston, the number of components increases. If the number of components increases, this has an influence on productivity, durability, reliability, and so on. As such, it is required to reduce number of components while obtaining a desired characteristic, i.e. a damping force characteristic covering a wide range of vibration frequencies. Hereinafter, each embodiment of the present invention will be described with reference to the drawings.

[First Embodiment]

A first embodiment of the present invention will be described with reference to FIGS. 1 through 3. To facilitate understanding of the following description, a lower side of the figure is defined as one side, and contrastively, an upper side of the figure is defined as the other side.

As shown in FIG. 1, a shock absorber of the first embodiment is a mono-tube type hydraulic shock absorber, and includes a bottomed cylindrical cylinder 10 in which oil is enclosed as a working fluid. A piston 11 is slidably fitted into the cylinder 10, and the cylinder 10 is partitioned into two chambers, i.e. an upper chamber 12 and a lower chamber 13, by the piston 11. The piston 11 is configured of a piston body 14, an annular sliding member 15 mounted on an outer circumferential surface of the piston body 14, and an insertion portion of a piston rod 16 connected to the piston body 14 wherein the insertion portion is inserted into the piston body 14.

The piston body 14 is formed by sintering, and is connected to one end of the piston rod 16. The other end of the piston rod 16 is inserted through a rod guide 17 and an oil seal 18 mounted on an opening side of the cylinder 10, and extends to the outside of the cylinder 10.

The piston rod 16 includes a main shaft part 20, and an attaching shaft part 21 having a smaller diameter than the main shaft part 20. The piston body 14 is attached at one end of the attaching shaft part 21, A part of the main shaft part 20 of the piston rod 16 between the piston body 14 and the rod guide 17 is provided with a rebound stopper 24 and a buffer 25 into which the piston rod 16 is inserted. A partition 26 for partitioning the lower chamber 13 on the side of the piston 11 is slidably installed in the cylinder 10 on a side closer to a bottom of the cylinder 10 than the piston 11. Oil is enclosed in the upper and lower chambers 12 and 13 of the cylinder 10, and a chamber 27 partitioned from the lower chamber 13 by the partition 26 is enclosed with high-pressure gas (of about 20 to 30 atm). For example, one side of the aforementioned shock absorber is supported by the body of a vehicle, and a wheel side is fixed to the other side of the shock absorber. In contrast, the other side of the shock absorber may be supported by the vehicle body, and the wheel side may be fixed to one side of the shock absorber. When the wheel is vibrated during traveling, positions of the cylinder 10 and the piston rod 16 are relatively changed by such vibration. This change is suppressed by fluid resistance of a flow passage formed in the first piston 11. As will be described below in detail, the fluid resistance of the flow passage formed in the first piston 11 is adapted to be varied by a speed or amplitude of the vibration, so that ride comfort is improved by suppressing the vibration. In addition to the vibration generated from the wheel, an inertial force or a centrifugal force generated from the vehicle body during the traveling of the vehicle is also applied between the cylinder 10 and the piston rod 16. For example, a traveling direction is changed by steering, and thus the centrifugal force is generated from the vehicle body. A force based on this centrifugal force is applied between the cylinder 10 and the piston rod 16. As will be described below, the shock absorber of the present embodiment provides good characteristics with respect to the vibration based on the force generated from the vehicle body during the traveling of the vehicle, and secures high stability in connection with the traveling of the vehicle.

Figure 2:
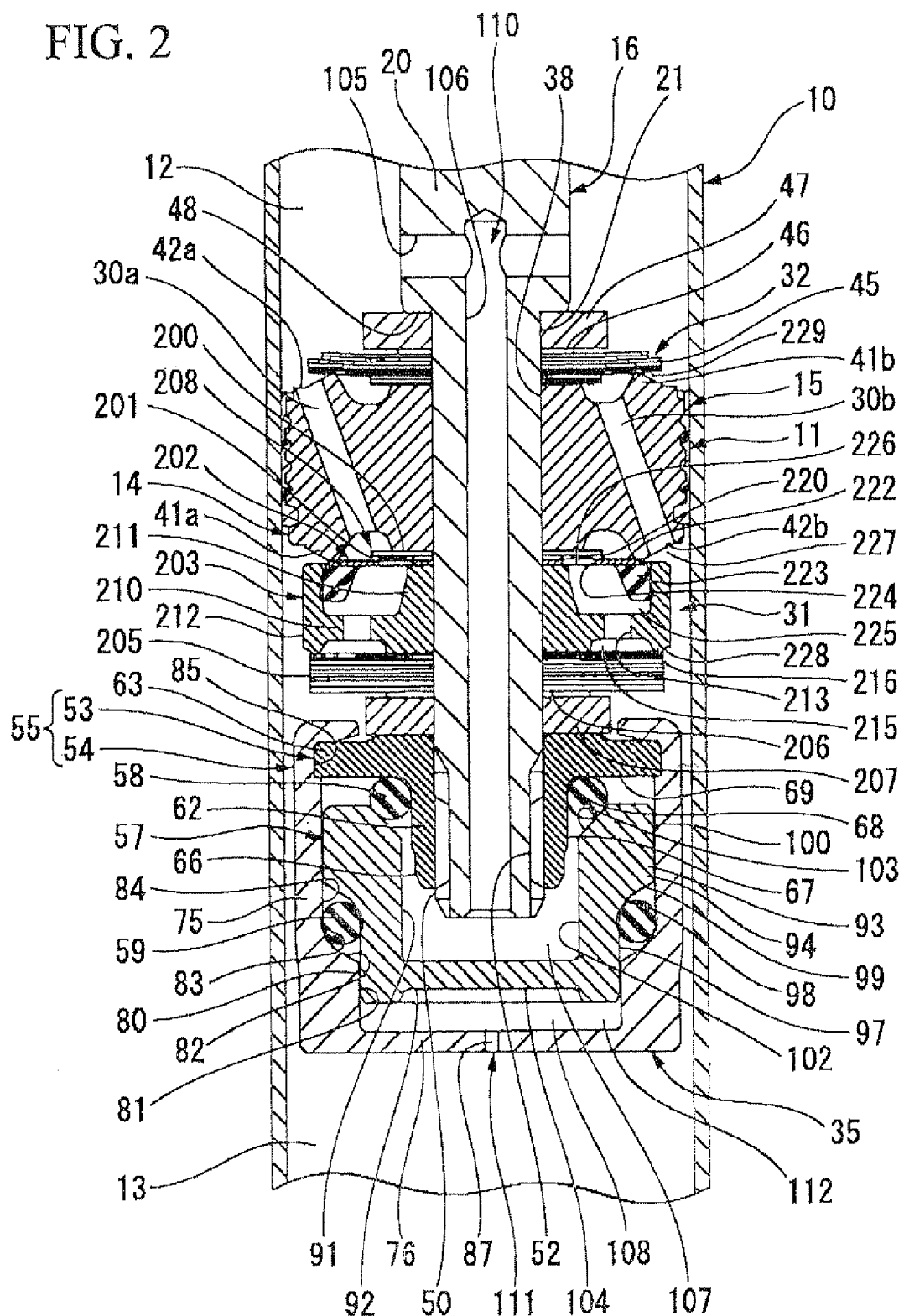
FIG. 2 is a cross-sectional view showing main parts of the shock absorber according to the first embodiment of the present invention.

As shown in FIG. 2, the piston body 14 is provided with a plurality of passages (first passages) 30a (only one of them is shown in FIG. 2, because they are shown in a cross-sectional view) through which oil flows out from the upper chamber 12 to the lower chamber 13 in connection with movement toward the upper chamber 12 of the piston 11, i.e. an expansion stroke, and a plurality of passages (first passages) 30b (only one of them is shown in FIG. 2, because they are shown in a cross-sectional view) through which oil flows out from the lower chamber 13 to the upper chamber 12 in connection with movement toward the lower chamber 13 of the piston 11, i.e. a contraction stroke, both of which allow the upper chamber 12 and the lower chamber 13 to communicate with each other. The passages 30a made up of half of these passages are formed at an equal pitch in a circumferential direction with each passage 30b interposed between every two of the passages 30a. One axial side of the piston 11 (an upper side of FIG. 1) is open to the outside in a radial direction, and the other axial side of the piston 11 (a lower side of FIG. 1) is open to the inside in a radial direction. Alternatively, the passages 30a and 30b may be formed outside the cylinder 10 by, for instance, pipes.

Further, a damping force generation mechanism 31 for generating a damping force is installed on half 30a of these passages. The damping force generation mechanism 31 is disposed on the side of the lower chamber 13 of the axial direction of the piston 11, and is attached to the attaching shaft part 21 of the piston rod 16. The passages 30a configure expansion-side passages through which oil flows when the piston 11 moves to the expansion side where the piston rod 16 moves out of the cylinder 10, and the damping force generation mechanism 32a provided for these passages configures an expansion-side damping force generation mechanism that regulates the oil flow of the expansion-side passages 30a to generate a damping force.

The passages 30b made up of the remaining half are formed at an equal pitch in a circumferential direction with each passage 30a interposed between every two of the passages 30b. The other axial side of the piston 11 (a lower side of FIG. 1) is open to the outside in a radial direction, and the one axial side of the piston 11 (an upper side of FIG. 1) is open to the inside in a radial direction.

A damping force generation mechanism 32 for generating a damping force is installed on the remaining half 30b of these passages. The damping force generation mechanism 32 is disposed on the side of the upper chamber 12 of the axial direction of the piston 11, and is attached to the attaching shaft part 21 of the piston rod 16. The passages 30b configure contraction-side passages through which oil flows when the piston 11 moves to the contraction side where the piston rod 16 moves into the cylinder 10, and the damping force generation mechanism 32 provided for these passages configures a contraction side damping force generation mechanism that controls the oil flow of the contraction-side passages 30b to generate a clamping force.

A damping force varying mechanism 35 is attached to the piston rod 16 on an end of the attaching shaft part 21 which is still farther from the damping force generation mechanism 31.

The piston body 14 has substantially a disc shape, and is provided with an insertion hole 38 in the center thereof which passes in an axial direction and into which the attaching shaft part 21 of the piston rod 16 is inserted.

At the end of the piston body 14 on the side of the lower chamber 13, a seat part 41a is formed on the openings of one ends of the expansion-side passages 30a in an annular shape. At the end of the piston body 14 on the side of the axial upper chamber 12, a seat part 41b constituting the damping force generation mechanism 32 is formed on the openings of one ends of the contraction-side passages 30b in an annular shape.

The piston body 14 is provided with an annular step part 42b, which has a lower axial height than the seat part 41a, on the opposite side of the seat part 41a from the insertion hole 38. The other ends of the contraction-side passages 30b are open to the step part 42b. The piston body 14 is provided with an annular step part 42a, which has a lower axial height than the seat part 41b, on the opposite side of the seat part 41b from the insertion hole 38. The other ends of the expansion-side passages 30a are open to the step part 42a. Further, although not shown, the seat part 41b is also provided with passage grooves (orifices) recessed in an axial direction so as to extend outwardly from the respective passages 30b in a radial direction of the piston 11 to run to the step part 42a.

The expansion-side damping force generation mechanism 31 includes a disc 200, an intermediate disc 201, a damping valve body 202, a valve member 203, a disc valve (a discharge valve) 205, a spacer 206, and a valve regulating member 207, all of which are sequentially disposed from the side of the upper chamber 12, i.e. the side of the piston body 14. The disc 200, the intermediate disc 201, and the damping valve body 202 constitute a damping valve 208. The damping valve 208 is provided between the passages 30a of the piston body 74 and passages 215 of the valve member 203, and regulates a flow of oil, which is caused by sliding of the piston 11, to generate a damping force. That is, the damping valve 208 serves as a disc valve. Further, as the damping valve 208, for example, a poppet valve may be used in addition to the disc valve.

The valve member 203 includes a bored disc-shaped bottom part 210 located in a direction perpendicular to the axis thereof, an inner cylindrical part 211 having a cylindrical shape formed on an inner circumference of the bottom part 210 in an axial direction, and an outer cylindrical part 212 having a cylindrical shape formed on an outer circumference of the bottom part 210 in an axial direction. The bottom part 210 is provided with a plurality of through-holes 213, each of which passes through in an axial direction. A space between the inner and outer cylindrical parts 211 and 212 of the valve member 203 including the plurality of through-holes 213 communicates with the passages 30a of the piston body 14, thereby allowing the upper chamber 12 and the lower chamber 13 to communicate with each other, and forming the passages (first passages) 215 through which oil flows out from the upper chamber 12 to the lower chamber 13 by means of movement of the piston 11 toward the upper chamber 12. The outer cylindrical part 212 is provided with an annular seat part 216 on the side of the lower chamber 13 in its axial direction. Although not shown, the seat part 216 is provided with passage grooves passing through in a radial direction. Further, in place of the passage grooves formed in the seat part 216, notches may be formed in an outer circumference of the disc valve 205 contacting the seat part 216, thereby forming passages.

The disc 200 is formed in a bored disc shape having a smaller outer diameter than the seat part 41a of the piston body 14. The intermediate disc 201 is formed in a bored disc shape having the same outer diameter as the disc 200, and is provided with a plurality of notch parts 220 in an outer circumference thereof.

The damping valve 208 is configured so that the damping valve body 202 thereof is interposed between the passages 30a of the piston body 14 and the passages 215 of the valve member 203, and regulates the flow of oil, which is generated by sliding of the piston 11, to generate a damping force. The damping valve body 202 is made up of a disc 222 that has a bored disc shape and can be seated on the seat part 41a of the piston body 14, and an annular seal member 223 that is formed of a rubber material and is adhered to an outer circumference of the disc 222 which is opposite to the piston body 14. The disc 222 is provided with through-holes 224 that pass through in an axial direction and are located inside the seal member 223 in a radial direction. In the damping valve body 202, the through holes 224 are located inside the seat part 41a, and are aligned with the notch parts 220 of the intermediate disc 201 in a radial direction so as to be able to communicate with the notch parts 220 of the intermediate disc 201. The seal member 223 is in contact with an inner circumferential surface of the outer cylindrical part 212 of the valve member 203, thereby sealing a gap between the damping valve body 202 and the outer cylindrical part 212 of the valve member 203. A space between the outer cylindrical part 212, the bottom part 210 and the inner cylindrical part 211 of the valve member 203 and the damping valve body 202 forms back pressure chambers 225, whose internal pressure is applied to the damping valve body 202 in a valve closing direction where the damping valve body 202 comes into contact with the seat part 41a. Further, oil passages defined by the damping valve body 202 and the intermediate disc 201 including the through-holes 224 of the damping valve body 202 and the notch parts 220 of the intermediate disc 201 form back pressure chamber inflow oil passages 226, through which oil flows from the upper chamber 12 inside the cylinder 10 into the respective back pressure chambers 225. When the damping valve body 202 is opened by separation from the seat part 41a of the piston body 14, it causes the oil to flow from the passages 30a to the lower chamber 13 via radial flow passages 227 between the piston body 14 and the valve member 203.

The disc valve 205 is formed in an annular shape so as to be able to be seated on the seat part 216 of the valve member 203. The disc valve 205 is a member that opens the back pressure chambers 225 by separation from the seat part 216, and is formed by superposition of a plurality of annular discs. The spacer 206 is formed in an annular shape having a smaller diameter than the disc valve 205. The valve regulating member 207 is formed in an annular shape having a larger diameter than the spacer 206. The valve regulating member 207 regulates deformation of the disc valve 205 exceeding a normal range in an opening direction. Oil passages formed by the disc valve 205 and the passage grooves (not shown) of the seat part 216 of the valve member 203 are provided in the back pressure chambers 225, thereby forming discharge orifices 228 that cause the oil of the back pressure chambers 225 to flow out to a downstream side. The disc valve 205 is installed on the back pressure chambers 225, and thus causes the oil of the back pressure chambers 225 to flow out to a downstream side when opened.

The contraction-side damping force generation mechanism 32 includes an annular disc valve 45 that can be seated on the seat part 41b, an annular spacer 46 that has a smaller diameter than the disc valve 45 and is disposed on the opposite side of the disc valve 45 from the lower chamber 13, and an annular valve regulating member 47 that has a larger diameter than the spacer 46 and is disposed on the opposite side of the spacer 46 from the piston body 14. The valve regulating member 47 is in contact with a shaft step part 48 at the end of the main shaft part 20 of the piston rod 16 on the side of the attaching shaft part 21. The disc valve 45 is also formed by superposition of a plurality of annular discs. The disc valve 45 opens the passages 30b by separating from the seat part 41b. The valve regulating member 47 regulates deformation of the disc valve 45 which exceeds a normal range in an opening direction. Oil passages formed by the disc valve 45 and the passage grooves (not shown) of the seat part 41b of the piston body 14 form discharge orifices 229. In this embodiment, both the expansion-side disc valve 205 and the contraction-side disc valve 45 are shown as disc valves of an inner circumferential clamp as an example. However, the disc valve is not limited thereto, and may be any mechanism that generates a damping force. For example, the disc valve may be either a lift type valve biased by a coil spring or a poppet valve.

A male thread 50 is formed at a leading end of the piston rod 16. The damping force varying mechanism 35 is screwed on the male thread 50. The damping force varying mechanism 35 is configured of a housing 55 having a lid member 53 and a housing body 54, a free piston 57 slidably fitted into the housing 55, a contraction-side O-ring (a resistance element, an elastic body, or one elastic body) 58 that is interposed between the free piston 57 and the lid member 53 of the housing 55 and undergoes compressive deformation when the free piston 57 moves in one direction, and an expansion-side O-ring (a resistance element, an elastic body, or the other elastic body) 59 that is interposed between the free piston 57 and the housing body 54 of the housing 55 and undergoes compressive deformation when the free piston 57 moves in the other direction. The lid member 53 is provided with a female thread 52 into which the male thread 50 of the piston rod 16 is screwed. The housing body 54 has a bottomed cylindrical shape, and is attached to the lid member 53 such that an opening side of the housing body 54 is closed. Further, in FIG. 2, the O-rings 58 and 59 are shown in a natural state for the sake of convenience. Particularly, since the O-ring 59 functions as a seal, the O-ring 59 is preferably disposed so as to usually be deformed (non-circular cross section) in a mounted state.

Since the lid member 53 is formed mainly by cutting, the lid member 53 includes a lid cylinder part (extension part) 62 having an approximately cylindrical shape, and a disc-shaped lid flange part 63 that extends from an axial end of the lid cylinder part 62 in a radial outward direction.

The female thread 52 is formed on an inner circumference of the lid cylinder part 62, and protrudes inwardly from an axial intermediate position of the lid cylinder part 62 to an end position of the lid cylinder part 62 which is opposite to the lid flange part 63. A step part 66 is formed on an outer circumference of the lid cylinder part 62 on the opposite side of the lid flange part 63. A cylindrical surface part 67 and a curved surface part 68 are formed on an outer circumferential surface of the lid cylinder part 62 on the side closer to the lid flange part 63 than the step part 66. The cylindrical surface part 67 has a constant diameter, and the curved surface part 68 connected to the cylindrical surface part 67 is formed in an annular shape such that its diameter increases with the distance from the cylindrical surface part 67 in an axial direction, and is connected to a flange surface part 69 of the lid flange part 63 on the side of the lid cylinder part 62. The curved surface part 68 is formed so that its cross section including a central axis of the lid member 53 has an arcuate shape.

The housing body 54 is formed mainly by cutting. The housing body 54 includes a housing cylinder part 75 having an approximately cylindrical shape, and a housing bottom part 76 that closes an axial end of the housing cylinder part 75.

An inner annular protrusion 80 (a housing-side annular protrusion) of an annular shape which protrudes in a radial inward direction is formed on an inner circumference of an end of the housing cylinder part 75 on the side of the housing bottom part 76. A small-diameter cylindrical surface part 81, a tapered surface part (an inclined surface) 82, a curved surface part (an inclined surface) 83, a large-diameter cylindrical surface part 84, and a large-diameter fitting cylindrical surface part 85 are sequentially formed on the inner circumference of the housing cylinder part 75 starting from the side of the housing bottom part 76. The small-diameter cylindrical surface part 81 has a constant diameter. The tapered surface part 82 connected to the small-diameter cylindrical surface part 81 is configured so that its diameter increases with the distance from the small-diameter cylindrical surface part 81. The curved surface part 83 connected to the tapered surface part 82 is formed in an annular shape such that its diameter increases with the distance from the tapered surface part 82. The large-diameter cylindrical surface part 84 connected to the curved surface part 83 has a constant diameter that is greater than a diameter of the small-diameter cylindrical surface part 81. The fitting cylindrical surface part 85 adjacent to the large-diameter cylindrical surface part 84 in an axial direction has a greater diameter than the large-diameter cylindrical surface part 84. The curved surface part 83 is formed so that its cross section including a central axis of the housing body 54 has an arcuate shape. The small-diameter cylindrical surface part 81, the tapered surface part 82, and the curved surface part 83 are formed on the inner annular protrusion 80. Meanwhile, the housing has been described as a cylinder, although the inner circumferential surface thereof preferably has a circular cross section, and the outer circumferential surface thereof may have a non-circular cross section such as a polygonal cross section.

The lid member 53 is inserted into the housing body 54 from the opening side of the housing body 54 with the lid cylinder part 62 directed to a destination. At this time, the lid member 53 makes the lid flange part 63 to be fitted into the fitting cylindrical surface part 85. In this state, the opening end of housing cylinder part 75 is swaged toward the inside. Thereby, the lid member 53 is fixed to the housing body 54 as one body, thus constructing the housing 55. The housing bottom part 76 is provided with a communicating hole (an orifice) 87 in the center thereof which passes through in an axial direction.

The free piston 57 is formed mainly by cutting. The free piston includes a piston cylinder part (a cylinder part) 91 of an approximately cylindrical shape, a piston bottom part 92 closing one axial end of the piston cylinder part 91, and a piston flange part (flange part) 94 having an outer annular protrusion (a free piston-side annular protrusion) 93 of an annular shape which extends outwardly from the other axial end of the piston cylinder part 91 in a radial direction.

A small-diameter cylindrical surface part 97, a curved surface part (an inclined surface) 98, a tapered surface part (an inclined surface) 99, and a large-diameter cylindrical surface part 100 are sequentially formed on outer circumferential surfaces of the piston cylinder part 91 and the piston flange part 94 starting from the side of the piston bottom part 92. The small-diameter cylindrical surface part 97 is formed on the piston cylinder part 91. The curved surface part 98, the tapered surface part 99, and the large-diameter cylindrical surface part 100 are formed on the piston flange part 94. The small-diameter cylindrical surface part 97 has a constant diameter, and the curved surface part 98 connected to the small-diameter cylindrical surface part 97 is formed in an annular shape such that its diameter increases with the distance from the small-diameter cylindrical surface part 97. The tapered surface part 99 connected to the curved surface part 98 is configured so that its diameter increases with the distance from the curved surface part 98. The large-diameter cylindrical surface part 100 connected to the tapered surface part 99 has a constant diameter that is greater than a diameter of the small-diameter cylindrical surface part 97. The curved surface part 98 is formed so that its cross section including a central axis of the free piston 57 has an arcuate shape.

A cylindrical surface part 102 and a tapered surface part (an inclined surface) 103 are sequentially formed on an inner circumferential surface of the piston cylinder part 91 starting from the piston bottom part 92. The cylindrical surface part 102 on the side of the piston bottom part 92 is formed on the piston cylinder part 91. Both the cylindrical surface part 102 on the opposite side of the piston bottom part 92 and the tapered surface part 103 are formed on the piston flange part 94. The cylindrical surface part 102 has a constant diameter, and the tapered surface part 103 connected to the cylindrical surface part 102 is configured so that its diameter increases with the distance from the cylindrical surface part 102.

The piston bottom part 92 on the opposite side of the piston cylinder part 91 is provided with a recessed part 104 in the center thereof which is recessed in an axial direction.

The large-diameter cylindrical surface part 100 of the free piston 57 is slidably fitted on the large-diameter cylindrical surface part 84 of the housing body 54. Further, the small-diameter cylindrical surface part 97 of the free piston 57 is slidably fitted on the small-diameter cylindrical surface part 81 of the housing body 54. In this state, a position of the tapered surface part 82 of the housing body 54 and a position of the curved surface part 98 of the free piston 57 are superimposed on each other in radial directions thereof, and a position of the curved surface part 83 of the housing body 54 and a position of the tapered surface part 99 of the free piston 57 are superimposed on each other in radial directions thereof. Thus, both the tapered surface part 82 and the curved surface part 83 of the housing body 54 are opposite to both the curved surface part 98 and the tapered surface part 99 of the free piston 57 in a moving direction of the free piston 57. Further, the flange surface part 69 of the lid member 53 is opposite to the tapered surface part 103 of the free piston 57 in a moving direction of the free piston 57. The tapered surface part 82 of the housing body 54 and the tapered surface part 99 of the free position 57 are inclined to the axes thereof at the same angle. The curved surface part 98 of the free piston 57 has the same cross-sectional curvature as the curved surface part 83 of the housing body 54. Furthermore, the curved surface parts 83 and 98 have radii of curvature greater than a cross-sectional radius of the O-ring 59 having the circular cross section.

Thus, the O-ring 59 is disposed between the small-diameter cylindrical surface part 97, the curved surface part 98, and the tapered surface part 99 of the free piston 57 and the tapered surface part 82, the curved surface part 83, and the large-diameter cylindrical surface part 84 of the housing body 54, in other words, between the outer annular protrusion 93 of the free piston 57 and the inner annular protrusion 80 of the housing body 54. In a natural state, the O-ring 59 is configured so that its cross section including a central axis has a circular shape, an inner diameter being smaller than the small-diameter cylindrical surface part 97 of the free piston 57, and an outer diameter being greater than the large-diameter cylindrical surface part 84 of the housing body 54. That is, the O-ring 59 is fitted in interference with both the free piston 57 and the housing body 54 in a radial direction.

Further, the O-ring 58 is disposed between the cylindrical surface part 67, the curved surface part 68, and the flange surface part 69 of the lid member 53 and the tapered surface part 103 of the free piston 57. In a natural state, the O-ring 58 is configured so that its cross section including a central axis has a circular shape, and the same inner diameter as the cylindrical surface part 67 of the lid member 53. Both of the O-rings 58 and 59 maintain the free piston 57 at a neutral position with respect to the housing 55, and allow the free piston 57 to axially move toward the upper chamber 12 and the lower chamber 13 relative to the housing 55. The free piston 57 located at the neutral position is axially separated from the housing bottom part 76 of the housing body 54 and the lid flange part 63 of the lid member 53 in order to move in an axial direction, and has a gap from the lid cylinder part 62 in a radial direction.

In the free piston 57, the O-ring 59 is in contact with the small-diameter cylindrical surface part 97, the curved surface part 98, and the tapered surface part 99. Among them, the curved surface part 98 and the tapered surface part 99 are inclined to the moving direction of the free piston 57. Further, in the free piston 57, the O-ring 58 is in contact with the tapered surface part 103 that is inclined to the moving direction of the free piston 57.

In tire housing 55, the O-ring 59 is in contact with the tapered surface part 82, the curved surface part 83, and the large-diameter cylindrical surface part 84. Among them, the tapered surface part 82 and the curved surface part 83 are inclined to the moving direction of the free piston 57. Further, in the housing 55, the O-ring 58 is in contact with the cylindrical surface part 67, the curved surface part 68, and the flange surface part 69.

Thus, a free piston contact surface, on which the small-diameter cylindrical surface part 97, curved surface part 98 and tapered surface part 99 of the free piston 57 are in contact with the O-ring 59, and a housing contact surface, on which the large-diameter cylindrical surface part 84, curved surface part 83 and tapered surface part 82 of the housing 55 are in contact with the O-ring 59, are constructed so that the shortest distance between the portions that are in contact with the O-ring 59 is changed by the movement of the free piston 57, and the inclined angle of a segment connecting the portions forming the shortest distance increases. In other words, shapes of the small-diameter cylindrical surface part 97, the curved surface part 98 and the tapered surface part 99 and shapes of the large-diameter cylindrical surface part 84, the curved surface part 83 and the tapered surface part 82 are set so that the direction of the segment, which represents the shortest distance between the portions where the O-ring 59 is in contact with the free piston contact surface of the free piston 57 and the housing contact surface of the housing 55, is changed. In detail, when the free piston 57 is positioned on the side of the upper chamber 12 with respect to the housing 55, the shortest distance between the portions where the O-ring 59 is in contact with the free piston contact surface and the housing contact surface is a difference in radius between the large-diameter cylindrical surface part 84 and the small-diameter cylindrical surface part 97 (because a difference in radius between the outer and inner diameters of the O-ring 59 is greater than the difference in radius between the large-diameter cylindrical surface part 84 and the small-diameter cylindrical surface part 97, the O-ring 59 is compressive deformed by the difference, and the deformed portion, i.e. the segment of the shortest distance, has an inclined angle equal to zero (0)). On the other hand, when the free piston 57 moves toward the lower chamber 13 relative to the housing 55, the portions contacted with the O-ring 59 are the curved surface part 98 and the curved surface part 83, and the position where the O-ring 59 is compressive deformed to the maximum extent, i.e. the segment of the shortest distance, has an inclined angle other than zero (0) (the inclined angle of the segment representing the shortest distance increases).

The piston flange part 94 is formed on one end of the free piston 57. The piston flange part 94 has the tapered surface part 103 inclined on an inner circumference thereof, and the curved surface part 98 and the tapered surface part 99 inclined on an outer circumference thereof. The lid cylinder part 62, which extends into the piston cylinder part 91 of the free piston 57, is formed on a part of the lid member 53 of the housing 55. The O-ring 58 is disposed to be in contact with the tapered surface part 103 on the inner circumferential surface of the piston flange part 94 and the lid cylinder part 62. The O-ring 59 is disposed to be in contact with the small-diameter cylindrical surface part 97, the curved surface part 98, and the tapered surface part 99, all of which are the outer circumferential surface of the piston flange part 94, and the tapered surface part 82, the curved surface part 83, and the large-diameter cylindrical surface part 84, all of which are the inner circumferential surface of the housing 55.

The damping force varying mechanism 35 is assembled by inserting the O-ring 59 into the housing body 54 up to a position of the curved surface part 83, fitting the free piston 57 on the inside of the housing body 54 and the O-ring 59, disposing the O-ring 58 on the tapered surface part 103 of the free piston 57, fitting the lid member 53 into the housing body 54 while inserting the lid, cylinder part 62 on the inside of the O-ring 58, and swaging the housing body 54. Thus, the damping force varying mechanism 35 pre-assembled in this way is attached by screwing the female thread 52 of the housing 55 onto the male thread 50 of the attaching shaft part 21 of the piston rod 16. At this time, the lid flange part 63 of the housing 55 comes into contact with the valve regulating member 207 of the damping force generation mechanism 31, and the damping force generation mechanism 31, the piston body 14, and the damping force generation mechanism 32 are held between the shaft step part 48 of the piston rod 16 and the lid flange part 63 of the housing 55. That is to say, the damping force varying mechanism 35 also serves as a fastening member that fastens the damping force generation mechanism 31, the piston body 14, and the damping force generation mechanism 32 to the piston rod 16. The outer diameter of the damping force varying mechanism 35, i.e. the outer diameter of the housing body 54, is set so as to be smaller than the inner diameter of the cylinder 10 to an extent that it does not serve as flow passage resistance.

The piston rod 16 has a passage hole 105 formed in the end of the main shaft part 20 on the side of the attaching shaft part 21 in a radial direction. The attaching shaft part 21 has a passage hole 106 formed in an axial direction to communicate with the passage hole 105. Accordingly, the upper chamber 12 communicates with a pressure chamber 112, which is formed in the housing 55 of the damping force varying mechanism 35, by means of the passage holes 105 and 106. In detail, the upper chamber 12 communicates with an upper chamber communicating chamber 107 of the pressure chamber 112, where the upper chamber communicating chamber 107 is defined by the housing 55, the O-ring 58, and the free piston 57. Further, the lower chamber 13 communicates with the housing 55 via a communicating hole 87 formed in the housing bottom part 76 of the housing 55. In detail, the lower chamber 13 communicates with a lower chamber communicating chamber 108 of the pressure chamber 112, where the lower chamber communicating chamber 108 is defined by the housing 55, the O-ring 59, and the free piston 57. Further, the O-ring 59 disposed between the housing body 54 and the free piston 57 is disposed so as to always seal between the housing 55 and the free piston 57, and blocks the communication between the upper chamber communicating chamber 107 and the lower chamber communicating chamber 108 at all times.

The passage holes 105 and 106 and the upper chamber communicating chamber 107 constitute a passage (second passage) 110, to which oil flows out from the upper chamber 12 of the cylinder 10 by means of the movement of the piston 11 toward the upper chamber 12. The communicating hole 87 and the lower chamber communicating chamber 108 constitute a passage (second passage) 111 to which oil flows out from the lower chamber 13 of the cylinder 10 by means of the movement of the piston 11 toward the lower chamber 13. Thus, a flow passage corresponding to a part of the passage 110 and a flow passage corresponding to the entirety of the passage 111 are formed in the housing 55. The free piston 57 is inserted into the pressure chamber 112 inside the housing 55 so as to freely slide in the pressure chamber 112 disposed between the passages 110 and 111, and partitions the passages 110 and 111 into an upstream side and a downstream side. Here, the second passages are partitioned by the free piston 57, and substantially generate a flow, because although a flow of oil replaced between the upper chamber 12 and the lower chamber 13 does not occur, the oil of the upper chamber 12 flows into the pressure chamber 112 while the free piston 57 is moving relative to the housing 55, and thus the same amount of oil flows toward the lower chamber 13 under pressure. The O-rings 58 and 59, which are disposed on the opposite sides of the free piston 57 in a sliding direction of the free piston 57, generate resistance to the displacement of the free piston 57. The passages 30a and 30b and the passage 110 are formed in the piston 11 including a part of the piston rod 16.

In the expansion stroke in which the piston rod 16 moves to an expansion side, when only the damping force generation mechanism 31 operates, and when a piston speed is slow, the oil flows from the upper chamber 12 to the lower chamber 13 via the passages 30a, the passages 215 including the back pressure inflow oil passages 226 and the back pressure chambers 225, and the discharge orifices 228 formed by the passage grooves (not shown) formed in the seat part 216 of the valve member 203 and the disc valve 205, so that a damping farce having an orifice characteristic (where the damping force is approximately proportional to the square of the piston speed) is generated. As such, the characteristic of the damping force over the piston speed shows that an increasing rate of the damping force becomes relatively high in relation to an increase in the piston speed. When the piston speed becomes fast, the oil flows from the upper chamber 12 to the passages 30a and the passages 215, opens the disc valve 205 to pass between the disc valve 205 and the seat part 216, and reaches the lower chamber 13, so that a damping force having a valve characteristic (where the damping force is approximately proportional to the piston speed) is generated. As such, the characteristic of the damping force over the piston speed shows that the increasing rate of the damping force is slightly reduced in relation to the increase of the piston speed.

When the piston speed enters a higher speed region, the relationship of force (oil pressure) acting on a damping valve 208 shows that a force applied from the passages 30*a* in an opening direction is greater: than that applied from the back pressure chambers 225 in a closing direction. Accordingly, in this region, when the damping valve 208 is opened with the increase of the piston speed, an increase in damping force is suppressed because the oil flows to the lower chamber 13 via the flow passages 227 between the piston body 14 and the valve member 203 in addition to a flow of the oil that passes between the disc valve 205 and the seat part 216 toward the lower chamber 13. At this time, the characteristic of the damping force over the piston speed shows that the increasing rate of the damping force is negligible in relation to the increase of the piston speed.

Figure 3:
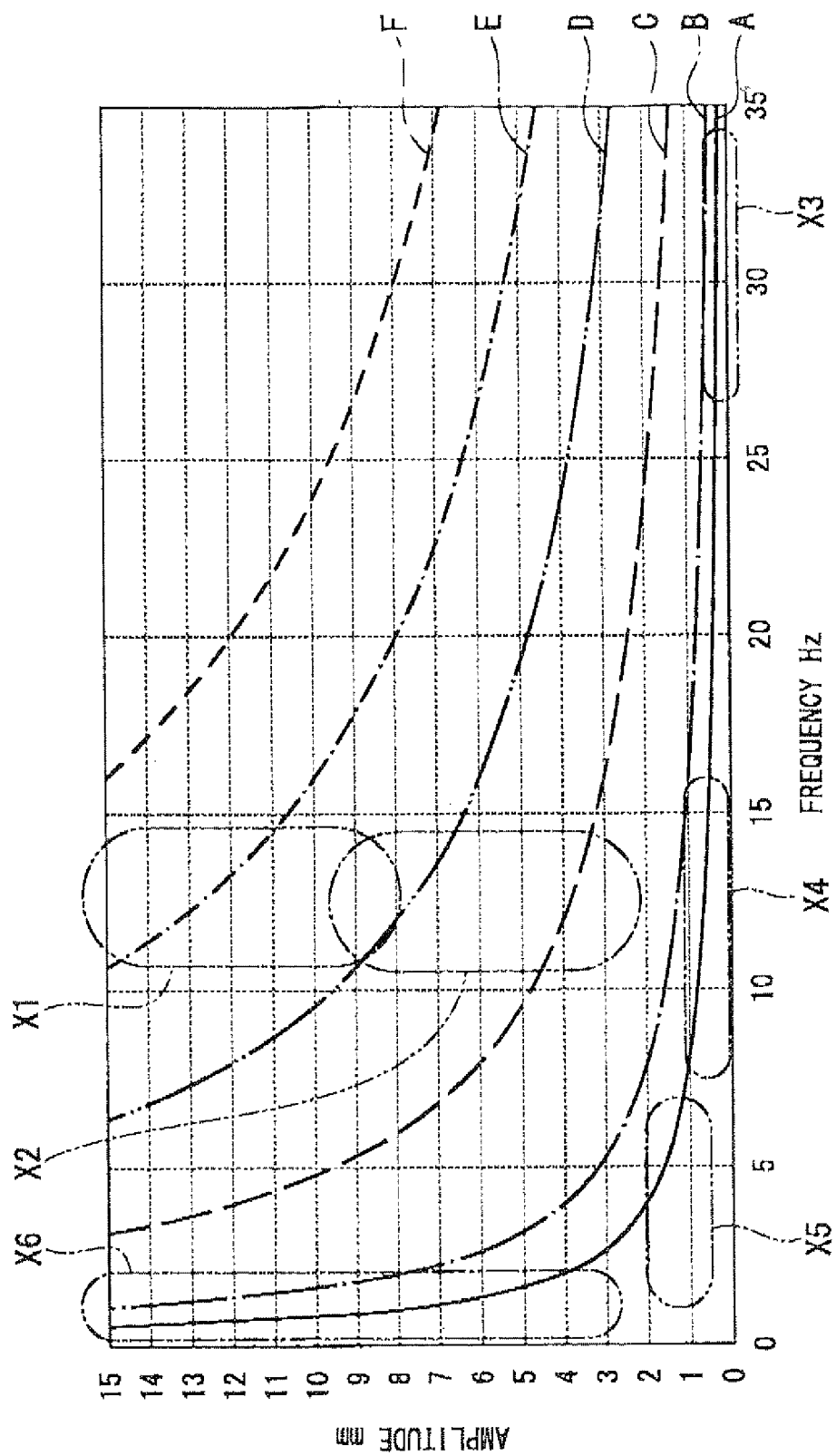
FIG. 3 is a characteristic diagram showing a relationship between a frequency and amplitude at each piston speed.

FIG. 3 shows a relationship between a frequency and an amplitude at each piston speed of A=0.05 m/s, B=0.1 m/s, C=0.3 m/s, D=0.6 m/s, E=1.0 m/s, and F=1.5 m/s. In FIG. 3, a region X1 is a region where the piston speed is high, where the frequency is relatively high, and when an impact shock generated by, for instance, unevenness of a road surface occurs. In the region where the piston speed is high as in the region X1, the increase of the damping force in relation to the increase of the piston speed is suppressed as described above, thereby sufficiently absorbing the shock.

Further, after the impact shock occurs, the amplitude becomes low, and the piston speed becomes low at the same frequency as when the impact shock occurs, and thus the region. X1 moves to the region X2 shown in FIG. 3. In the region X2, the relationship of forces acting on the damping valve 208 shows that a force applied from the passages 30*a* in an opening direction is smaller than that applied from the back pressure chambers 225 in a closing direction, and the damping valve 208 moves in a valve closing direction. Accordingly, a flow from the upper chamber 12 to the lower chamber 13 caused by an opening of the damping valve 208 is reduced, and a flow that passes between the disc valve 205 and the seat part 216 toward the lower chamber 13 becomes a main flow. For this reason, the increasing rate of a damping force is raised in relation to an increase in the piston speed. Thereby, variation in an unsprung region after the impact shock occurs is suppressed.

In the contraction stroke in which the piston rod 16 moves to a contraction side, when only the damping force generation mechanism 32 operates, and when the piston speed is slow, the oil flows from the lower chamber 13 to the upper chamber 12 via the passages 30*b* and the discharge orifices 229 partitioned by the passage grooves (not shown) formed in the seat part 41*b* of the piston body 14 and the disc valve 45 coming into contact with the seat part 41*b*, so that a damping force having an orifice characteristic (where the damping force is approximately proportional to the square of the piston speed) is generated. As such, the characteristic of the damping force over the piston speed shows that the increasing rate of the damping force becomes relatively high in relation to the increase of the piston speed. When the piston speed becomes high, the oil flowing from the lower chamber 13 to the passages 30*b* passes between the disc valve 45 and the seat part 41*b* to reach the upper chamber 12 while opening the disc valve 45, so that a damping force having a valve characteristic (where the damping force is approximately proportional to the piston speed) is generated. As such, the characteristic of the damping force over the piston speed shows that the increasing rate of the damping force is slightly reduced in relation to the increase of the piston speed.

The description has been made of the case where only the damping force generation mechanism 31 or 32 operates. On the other hand, as shown in FIG. 3 along with regions X3 to X5, a region where a frequency is relatively high when the piston speed is slow is, for instance, a region where vibration is generated from fine surface unevenness of a road surface. In this situation, it is preferable to lower the damping force. Here, the region X3 is a region where very fine unevenness is present on the road surface, and thus rattling and shaking vibration is transferred. The region X4 is a region where a slightly rougher unevenness than the region X3 is present on the road surface, and pulsatile vibration is transferred. The region X5 is a region where a slightly rougher unevenness than the region X4 is present on the road surface, and swinging vibration is transferred. In contrast, similarly, even when the piston speed is slow, a region where the frequency is relatively low rather than as above as shown in the region X6 is a region where vibration such as a shake is caused by rolling of a vehicle body. In this situation, it is preferable to raise the damping force.

Correspondingly, the aforementioned damping force varying mechanism 35 varies the damping force corresponding to the frequency even when the piston speed is slow in the same way. That is, when the piston speed is slow, if a reciprocating frequency of the piston 11 becomes high, a pressure of the upper chamber 12 becomes high in the expansion stroke of the piston 11, and thus the oil is caused to flow from the upper chamber 12 into the upper chamber communicating chamber 107 of the damping force varying mechanism 35 via the passage holes 105 and 106 of the piston rod 16. Simultaneously, the oil is caused to flow from the lower chamber communicating chamber 108 of the damping force varying mechanism 35 into the lower chamber 13 via the communicating hole 87 constituting the orifice of the downstream side of the passage 111. In the meantime, the free piston 57 moves toward the axial lower chamber 13 against a biasing force of the O-ring 59 located on the side of the lower chamber 13. In this way, as the free piston 57 moves toward the lower chamber 13, the oil flows from the upper chamber 12 into the upper chamber communicating chamber 107, and a flow rate of the oil that flows from the upper chamber 12 into the passages 30*a* and then flows through the damping force generation mechanism 31 into the lower chamber 13 is reduced. Thereby, the damping force is lowered.

In the following contraction stroke, since a pressure of the lower chamber 13 becomes high, the oil is caused to flow from the lower chamber 13 into the lower chamber communicating chamber 108 of the damping force varying mechanism 35 via the communicating hole 87 constituting the orifice of the downstream side of the passage. Simultaneously, the oil is caused to flow from the upper chamber communicating chamber 107 into the upper chamber 12 via the passage holes 105 and 106 of the piston rod 16. In the meantime, the free piston 57, which has moved toward the lower chamber 13 up to that time, moves toward the upper chamber 12 against a biasing force of the O-ring 58 located on the side of the upper chamber 12. In this way, as the free piston 57 moves toward the upper chamber 12, the oil flows from the lower chamber 3 into the lower chamber communicating chamber 108, and a flow rate of the oil that flows from the lower chamber 13 into the passages 30*b* and then flows through the damping force generation mechanism 32 into the upper chamber 12 is reduced. Thereby, the damping force is lowered.

In the region where the frequency of the piston 11 is high, a frequency of the movement of the free piston 57 also becomes high in proportion to the high frequency. As a result, in each aforementioned expansion stroke, the oil flows from the upper chamber 12 into the upper chamber communicating chamber 107. In each contraction stroke, the oil flows from the lower chamber. 13 to the lower chamber communicating chamber 108. Thereby, as described above, the damping force is maintained in a lowered state.

On the other hand, when the piston speed is slow, if the frequency of the piston 11 becomes low, the frequency of the movement of the free piston 57 is also reduced in proportion to the low frequency. As such, in the initial stage of the expansion stroke, the oil flows from the upper chamber 12 to the upper chamber communicating chamber 107. Afterwards, the free piston 57 compresses the O-ring 59, and is stopped on the side of the axial lower chamber 13, and the oil does not flow from the upper chamber 12 to the upper chamber communicating chamber 107. As such, the flow rate of the oil that flows from the upper chamber 12 into the passages 30a and then flows through the damping force generation mechanism 31 into the lower chamber 13 is in an unreduced state, and thus the damping force is raised.

Even in the following contraction stroke, in its initial stage, the oil flows from the lower chamber 13 to the lower chamber communicating chamber 108. Afterwards, the free piston 57 compresses the O-ring 58, and is stopped on the side of the axial upper chamber 12, and the oil does not flow from the lower chamber 13 to the lower chamber communicating chamber 108. As such, the flow rate of the oil that flows from the lower chamber 13 into the passages 30b and then flows through the damping force generation mechanism 32 into the upper chamber 12 is in an unreduced state, and thus the damping force is raised.

Thus, in the present embodiment, as described above, as a component for applying a biasing force to the free piston 57 so as to return it to its neutral position, the O-rings 58 and 59 formed of a rubber material are used. At the neutral position of the free piston 57, the O-ring 59 located between the free piston 57 and the housing body 54 is positioned between the large-diameter cylindrical surface part 84 of the housing 55 and the small-diameter cylindrical surface part 97 of the free piston 57.

For example, in the expansion stroke, when the free piston 57 moves from its neutral position toward the axial lower chamber 13 relative to the housing 55, the large-diameter cylindrical surface part 84 of the housing 55 and the small-diameter cylindrical surface part 97 of the free piston 57 mutually roll the O-ring 59, i.e., rotate the O-ring 59 such that the inner diameter side and the outer diameter side of the O-ring 59 move in the opposite directions, and to move toward the axial lower chamber 13 relative to the housing 55. Afterwards, the curved surface part 83 and the tapered surface part 82 of the housing 55 on the side of the axial upper chamber 12 and the curved surface part 98 and the tapered surface part 99 of the free piston 57 on the side of the axial lower chamber 13 roll the O-ring 59, and at the same time, compress the O-ring 59 in the axial and radial directions of the free piston 57. Continuously, the curved surface part 83 and the tapered surface part 82 of the housing 55 on the side of the axial lower chamber 13 and the curved surface part 98 and the tapered surface part 99 of the free piston 57 on the side of the axial upper chamber 12 compress the O-ring 59 in the axial and radial directions of the free piston 57.

At this time, a region where the O-ring 59 is rolled between the large-diameter cylindrical surface part 84 of the housing 55 and the small-diameter cylindrical surface part 97 of the free piston 57 and a region where the O-ring 59 is rolled between the curved surface part 83 and the tapered surface part 82 of the housing 55 and the curved surface part 98 and the tapered surface part 99 of the free piston 57 are a rolling region where the O-ring 59 is rolled at a position separated from a downstream side end within a moving region of the free piston 57. Further, at the position separated from the downstream side end, the rolling region is a moving region where the O-ring 59 moves in a moving direction of the free piston 57 in the state where the O-zing 59 is in contact with bath the housing 55 and the free piston 57. The term "moving" is defined that at least a downstream end position (a lower end position in FIG. 2) of the O-ring 59 in the moving direction of the free piston is changed.

Further, a region where the O-ring 59 is compressed between the curved surface part 83 and the tapered surface part 82 of the housing 55 and the curved surface part 98 and the tapered surface part 99 of the free piston 57 is a moving direction deformation region where the O-ring 59 undergoes elastic deformation in the moving direction of the free piston 57 on the downstream side end within the moving region of the free piston 57. The term "elastic deformation in the moving direction deformation region" is defined as deformation when an upstream end position (an upper end position in FIG. 2) of the O-ring 59 in the moving direction of the free piston is changed but a downstream end position is not changed. In the present embodiment, the rolling region and the moving region are partially overlapped on the moving direction deformation region.

In the following contraction stroke, when the free piston 57 moves toward the axial upper chamber 12 relative to the housing 55, the curved surface part 83 and the tapered surface part 82 of the housing 55 on the side of the axial lower chamber 13 and the curved surface part 98 and the tapered surface part 99 of the free piston 57 on the side of the upper chamber 12 release the compression of the O-ring 59. Then, the curved surface part 83 and the tapered surface part 82 of the housing 55 on the side of the upper chamber 12 and the curved surface part 98 and the tapered surface part 99 of the free piston 57 on the side of the lower chamber 13 roll the O-ring 59, and simultaneously release the compression of the O-ring 59. Then, the large-diameter cylindrical surface part 84 of the housing 55 and the small-diameter cylindrical surface part 97 of the free piston 57 mutually roll the O-ring 59, and simultaneously move the O-ring 59 toward the upper chamber 12 relative to the housing 55. Thus, in the state where the O-ring 58 is held on the cylindrical surface part 67, the curved surface part 68 and the flange surface part 69 of the housing 55, the free piston 57 compresses the O-ring 58 between the lid member 53 and the free piston 57 in the axial and radial directions of the free piston 57 in the proximity of its neutral position by means of the cylindrical surface part 67, the curved surface part 68, and the flange surface part 69, and the tapered surface part 103 of the free piston 57.

In the following expansion stroke, the cylindrical surface part 67, the curved surface part 68 and the flange surface part 69 of the housing 55, and the tapered surface part 103 of the free piston 57 release the compression of the O-ring 58 by relative movement in a separating direction. The large-diameter cylindrical surface part 84 of the housing 55 and the small-diameter cylindrical surface part 97 of the free piston 57 mutually roll the O-ring 59, and simultaneously move the O-ring 59 toward the lower chamber 13 relative to the housing 55. When the free piston 57 passes through its neutral position, it operates the O-ring 59 in the same way as described above.

With this construction, the O-ring 58 is compressive deformed in the moving direction in the moving direction deformation region, and the O-ring 59 moves in the moving direction of the free piston 57 in the moving region.

The characteristic of a load over the displacement of the free piston 57 caused by the O-rings 58 and 59 formed of a rubber material approaches a linear characteristic within a predetermined range in front of and behind the neutral position of the free piston 57. When beyond the predetermined range, the characteristic of a load has a nonlinear characteristic in which an increasing rate of the load smoothly increases depending on the displacement. As described above, since amplitude of the piston 11 is also small in the region where the operating frequency of the piston 11 is high, the displacement of the free piston 57 also becomes small, and the free piston 57 operates within the linear characteristic range in front of and behind its neutral position. Thereby, the free piston 57 is easy to move, vibrates in resonance with the vibration of the piston 11, and contributes to reducing the damping force generated from the damping force generation mechanisms 31 and 32.

On the other hand, since amplitude of the piston 11 becomes high in the region where the operating frequency of the piston 11 is low, the displacement of the free piston 57 becomes large, and the free piston 57 operates within the nonlinear characteristic range. Thereby, the free piston 57 gradually becomes difficult to operate smoothly, and has difficulty in reducing the damping force generated from the damping force generation mechanisms 31 and 32.

In the shock absorber disclosed in Japanese Unexamined Utility Model Application, First Publication No. H07-019642, in the region where the piston speed is relatively slow, the increasing rate of the damping force shows a tendency that is larger than the increasing rate of the piston speed. When the piston speed becomes high, the increasing rate of the damping force has a tendency that is smaller than the increasing rate of the piston speed. Furthermore, when the piston moves up and down with small amplitude, it is possible to easily obtain the change of the damping force. Further, in the shock absorber disclosed in Japanese Unexamined Patent Application, First Publication No. 2006-010069, it is possible to increase a degree of freedom for setting the damping force characteristic. In general, the shock absorbers are required to adequately control the damping force in response to various vibrating states according to road surface conditions.

According to the first embodiment described above, the damping valve 208 that regulates the flow of the oil caused by the sliding of the piston 11 to generate the damping force, the back pressure chambers 225 applying the internal pressure to the damping valve 208 in a valve closing direction, and the back pressure chamber inflow oil passages 226 causing the oil to flow from the upper chamber 12 to the back pressure chambers 225 are provided on the passages 30a and 215 to which the oil flows out from the upper chamber 12 inside the cylinder 10 by means of the movement of the piston 11. Further, the pressure chamber 112 including the free piston 57 in which slides freely is provided in-between on the passages 105 and 106 to which the oil flows out from the upper and lower chambers 12 and 13 in the cylinder 10 by means of the movement of the piston 11. As such, in the region in which the piston speed is fast and which is indicated by X1 in FIG. 3, it is possible to suppress the increase of the damping force in relation to the increase of the piston speed by means of the damping valve 208. Further, due to the free piston 57 and the pressure chamber 112, it is possible to lower the damping force when the frequency is high in the regions in which the piston speed is low and which are indicated by X3 to X5 in FIG. 3, and to raise the damping force when the frequency is low in the region in which the piston speed is low and which is indicated by X6 in FIG. 3. Accordingly, it is possible to adequately control the damping force in response to various vibrating states according to road surface conditions.

Further, since the O-rings 58 and 59 generating resistance to the displacement of the free piston 57 are provided, it is possible to smoothly change the damping force when changing the damping force in response to the frequency.

Further, since the housing 55 forming the pressure chamber 112 and the O-ring 59 interposed between the housing 55 and the free piston 57 are provided, it is possible to seal between the housing 55 and the free piston 57 using the O-ring 59, thereby it is possible to reduce the number of components.

Further, since the discharge orifices 228 causing the oil to flow out from the back pressure chambers 225 to the downstream side are formed in the back pressure chambers 225, it is possible to control the pressure of the back pressure chambers 225 by means of a simple structure.

Also, since the disc valve 205 causing the oil to flow out from the back pressure chambers 225 to the downstream side are installed on the back pressure chambers 225, it is possible to properly release the pressure of the back pressure chambers 225 to obtain a desired damping force characteristic.

Further, among the small-diameter cylindrical surface part 97, the curved surface part 98, and the tapered surface part 99 of the free piston 57 which are in contact with the O-ring 59, the curved surface part 98 and the tapered surface part 99 are inclined to the moving direction of the free piston 57. Among the tapered surface part 82, the curved surface part 83, and the large-diameter cylindrical surface part 84 of the housing 55 which are in contact with the O-ring 59, the tapered surface part 82 and the curved surface part 83 are inclined to the moving direction of the free piston 57. Due to the movement of the free piston 57, the shortest distance between the free piston contact surface of the small-diameter cylindrical surface part 97, the curved surface part 98, and the tapered surface part 99 which is in contact with the O-ring 59 and the housing contact surface of the tapered surface part 82, the curved surface part 83, and the large-diameter cylindrical surface part 84 which is in contact with the O-ring 59 is changed. As such, when the damping force is changed depending on the frequency, it is possible to smoothly change the damping force Meanwhile, at least one of the small-diameter cylindrical surface part 97, the curved surface part 98 and the tapered surface part 99; and the large-diameter cylindrical surface part 84, the curved surface part 83 and the tapered surface part 82 may be configured so that its shape changes the shortest distance between the free piston contact surface and the housing contact surface.

Further, since the inclined tapered surface part 99 and the curved surface part 98 of the free piston 57 include the curved surface part 98, and since the inclined tapered surface part 82 and the curved surface part 83 of the housing 55 include the curved surface part 83, it is possible to change the damping force more smoothly. Further, in this case as well, at least one of the curved surface parts 83 and 98 may be provided.

In addition, when the shortest distance between the free piston contact surface and the housing contact surface that are in contact with the O-ring 59 is reduced, the small-diameter cylindrical surface part 97, the curved surface part 98, and the tapered surface part 99, and the large-diameter cylindrical surface part 84, the curved surface part 83, and the tapered surface part 82 increase the inclined angle of the shortest distance. As such, it is possible to change the damping force more smoothly. Further, even when an O-ring having a small cross-sectional diameter is used, the O-ring is rolled, and thus a stroke distance of the free piston where resistance is applied by the O-ring of the free piston is allowed to increase (or to be larger than the diameter of the O-ring).

Since the O-ring 58 that undergoes compressive deformation when the free piston 57 moves in one direction and the O-ring 59 that undergoes compressive deformation when the free piston 57 moves in the other direction are provided, it is possible to smoothly change the damping force in both of the expansion stroke and the contraction stroke. Thereby, since the damping force is smoothly changed even in the event of a change in frequency, a change in piston speed, etc., no ride discomfort is caused by the change of the damping force. Particularly, in the event of a change in posture, the damping force gradually increases, and it is possible to suppress the change of posture without causing discomfort to a driver. Thereby, it is possible to provide a higher level of vehicle along with ride comfort and steering stability, compared to the shock absorber disclosed in Japanese Unexamined Utility Model Application, First Publication No. H07-019642.

In the present embodiment, the piston flange part 94 is installed on one end of the free piston 57. The piston flange part 94 is made up of the tapered surface part 103 inclined on the inner circumference thereof, and the curved surface part 98 and the tapered surface part 99 inclined on the outer circumference thereof. The lid cylinder part 62, which extends into the piston cylinder part 91 of the free piston 57, is installed on a part of the housing 55. The O-ring 58 is disposed to come into contact with the tapered surface part 103 of the inner circumference of the piston flange part 94 and the lid cylinder part 62. The O-ring 59 is disposed to come into contact with the curved surface part 98 and the tapered surface part 99 of the outer circumference of the piston flange part 94 and the inner circumferential surface of the housing 55. To this end, the O-ring 59 is disposed in the housing body 54, and the free piston 57 is disposed inside the housing body 54 and the O-ring 59. The O-ring 58 is disposed on the free piston 57. The lid cylinder part 62 is inserted into the O-ring 58. In the meantime, the lid member 53 is fixed to the housing body 54. Thereby, the shock absorber is assembled. Accordingly, assemble efficiency of each component can be improved.

Further, since the O-ring 59 is rolled between the free piston 57 and the housing 55, it is possible to change the damping force more smoothly. In, addition, even when an O-ring having a small cross-sectional diameter is used, the O-ring is rolled, and thus a stroke distance of the free piston where resistance is applied by the O-ring is allowed to increase (to be larger than the diameter of the O-ring). Thus, the technology disclosed in Japanese Unexamined Utility Model Application, First Publication No. H07-019642 in which the rubber is merely compressed (a stroke distance cannot be taken in excess of a thickness of the rubber in a compressive deformed direction) and the technology of the present embodiment are identical in that both use the rubber. However, as described above, both are different in view of the usage of the rubber, and thus are completely different in view of the technical idea. Furthermore, it is possible to prevent the spring constant from increasing sharply, and to obtain an approximately linear characteristic.

Since the passages 30a and 30b and the passage 110 are installed the piston 11, it is possible to simplify construction.

Since the communicating hole 87 is provided as an orifice upstream and downstream of the passage 111, the resistance to the movement of the free piston also acts on the orifice in addition to the O-ring, and thus it is possible to change the damping force more smoothly. Further, in the aforementioned embodiment, a small orifice is provided in the free piston 57, and thereby it is possible to change characteristics. In addition, the aforementioned embodiment has shown that the housing 55 is configured of the lid member 53 and the housing body 54. However, when the O-ring 58 is adapted to be in contact with the outer circumference of the lower end of the piston rod 16 by shortening the lid cylinder part 62, a portion of the lower end of the piston rod 16 also constitutes the housing 55.

[Second Embodiment]

Next, a second embodiment will be described focusing on portions different from those of the first embodiment mainly based on FIG. 4. Further, for parts that are in common with the first embodiment, the same name and reference character are used.

In the second embodiment, a piston rod 16 and a damping force generation mechanism 31 are partially different from those of the first embodiment. That is, an inner cylindrical part 211 and a bottom part 210 of a valve member 203 of the damping force generation mechanism 31 are provided with communicating holes 241 that connect back pressure chambers 225 to an insertion hole 38. The inner cylindrical part 211 is provided with communicating holes 242 that connect the back pressure chambers 225 to the insertion hole 38. Thus, passage holes 105 formed in the piston rod 16 in a radial direction are flush with an axial position of the communicating holes 241 and 242 and the piston rod 16 so as to be able to communicate with the communicating holes 241 and 242.

Further, in the second embodiment, a damping force varying mechanism 35 is partially different from that of the first embodiment. That is, a lid member 53 that is partially different from that of the first embodiment is used. This lid member 53 is configured so that a cylinder part (a housing-side annular protrusion) 121 is provided on an outer circumference side of a lid flange part 63. A tip face part 122 of the cylinder part 121 which is opposite to the lid flange part 63 is in line with a direction perpendicular to the axis of the lid member 53.

Further, in the second embodiment, a free piston 57 that is partially different from that of the first embodiment is used. The free piston 57 of the second embodiment is configured so that a piston cylinder part 91 thereof is provided with an outer annular protrusion (a piston-side annular protrusion) 93 of an annular shape, which protrudes outwardly in a radial direction, on an outer circumference thereof at an axial middle position thereof. A curved surface part 98, a tapered surface part 99, and a large-diameter cylindrical surface part 100, all of which are the same as those of the first embodiment, are sequentially formed on an outer circumferential surface of the outer annular protrusion 93 starting from the side of an lower chamber. Furthermore, a tapered surface part (an inclined surface) 131 and a curved surface part (an inclined surface) 132 are formed from the large-diameter cylindrical surface part 100. The tapered surface part 131 connected to the large-diameter cylindrical surface part 100 is configured so that its diameter decreases with the distance from the large-diameter cylindrical surface part 100. The curved surface part 132 connected to the tapered surface part 131 is formed in an annular shape such that its diameter decreases with the distance from the tapered surface part 131. A small-diameter cylindrical surface part 133 is connected to the curved surface part 132. The small-diameter cylindrical surface part 133 has the same diameter as a small-diameter cylindrical surface part 97. The curved surface part 132 is formed so that its cross section including a central axis of the free piston 57 has an arcuate shape. The curved surface parts 98 and 132, the tapered surface parts 99 and 131, and the large-diameter cylindrical surface part 100 are formed on the outer annular protrusion 93. The outer annular protrusion 93 of the second embodiment is symmetrical with respect to a plane going through the axial middle position thereof.

The free piston 57 is slidably fitted in the large-diameter cylindrical surface part 84 of a housing body 54 at the large-diameter cylindrical surface part 100, a small-diameter cylindrical surface part 81 of the housing body 54 at the small-diameter cylindrical surface part 97, and the cylinder part 121 of the lid member 53 at the small-diameter cylindrical surface part 133. In this state, a position of the tip face part 122 of the cylinder part 121 of the lid member 53 and a position of the tapered surface part 131 and a position of the curved surface part 132 of the free piston 57 are superimposed on each other in radial directions thereof. That is, the tip face part 122 of the cylinder part 121 and the tapered surface part 131 and the curved surface part 132 of the free piston 57 are opposite to each other in a moving direction of the free piston 57.

Figure 4:
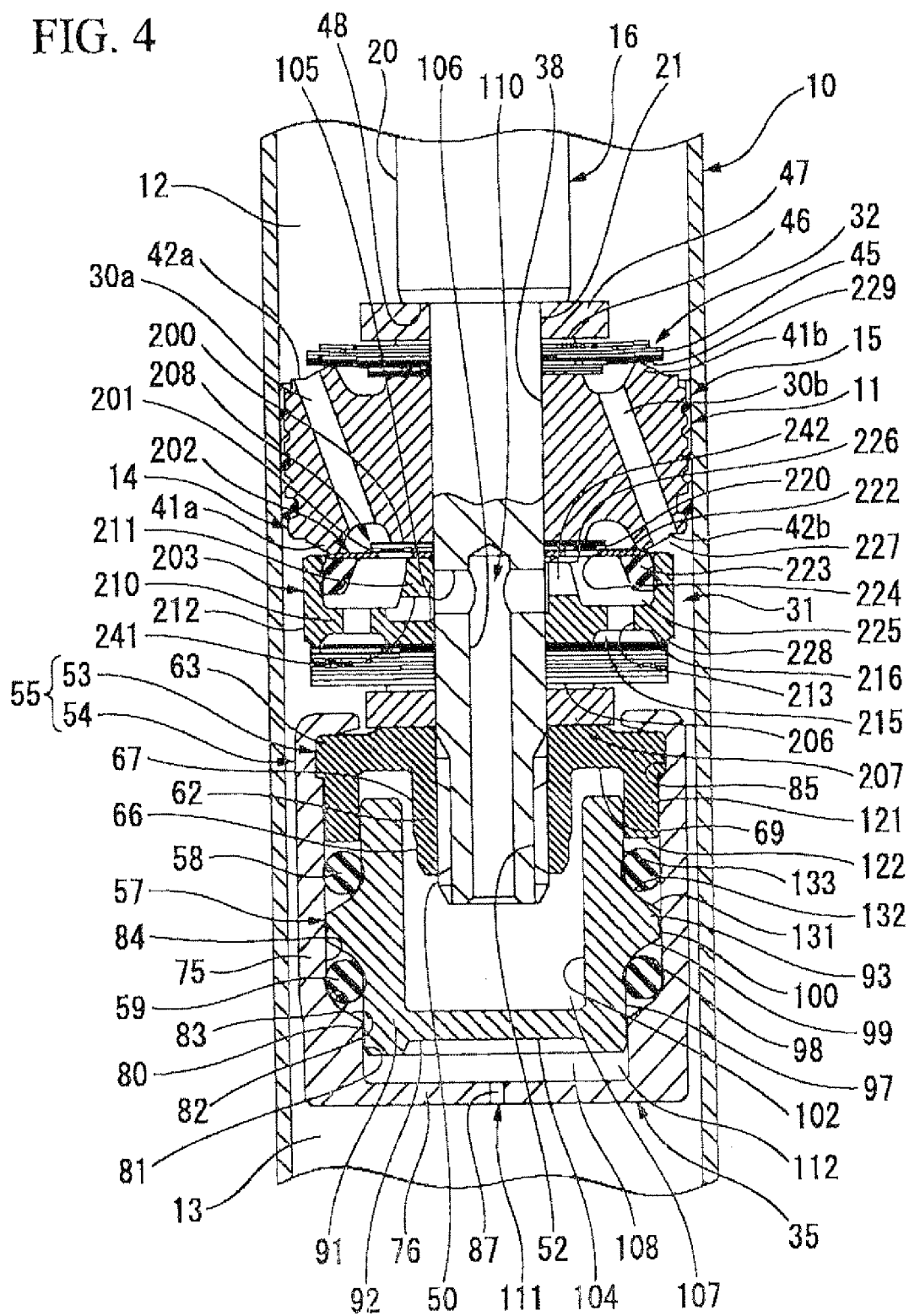
FIG. 4 is a cross-sectional view showing main parts of a shock absorber according to a second embodiment of the present invention.

Thus, an O-ring 59 FIG. 4 shows a natural state) is disposed between the tapered surface part 99, the curved surface part 98 and the small-diameter cylindrical surface part 97 of the free piston 57 and the tapered surface part 82, the curved surface part 83 and the large-diameter cylindrical surface part 84 of the housing body 54, in the same way as in the first embodiment.

In the second embodiment, an O-ring 58 RIG 4 shows a natural state) is disposed between the large-diameter cylindrical surface part 84 of the housing body 54, the tip face part 122 of the lid member 53, and the tapered surface part 131, the curved surface part 132 and the small-diameter cylindrical surface part 133 of the free piston 57. When the O-ring 58 is also in the natural state like the O-ring 59, its inner diameter is smaller than that of the small-diameter cylindrical surface part 133 of the free piston 57, and its outer diameter is greater than that of the large-diameter cylindrical surface part 84 of the housing body 54. That is, the O-ring 58 is also fitted in interference with both the free piston 57 and the housing body 54 in a radial direction.

Both of the O-rings 58 and 59 have the same size. Both of the O-rings 58 and 59 maintain the free piston 57 within a predetermined neutral range with respect to a housing 55, and allow the free piston 57 to axially move toward both of the upper and lower chambers 12 and 13 relative to the housing 55.

In the free piston 57 of the second embodiment, the O-ring 58 is in contact with the small-diameter cylindrical surface part 133, the curved surface part 132 and the tapered surface part 131. The curved surface part 132 and the tapered surface part 131 are inclined to the moving direction of the free piston 57. Further, in the housing 55, the O-ring 58 is in contact with the large-diameter cylindrical surface part 84 and the tip face part 122.

In other words, the outer annular protrusion 93 is formed on the outer circumference of the free piston 57. Axially opposite surfaces of the outer annular protrusion 93 constitute the curved surface part 98 and the tapered surface part 99, and the curved surface part 132 and the tapered surface part 131, respectively. An inner annular protrusion 80 and the cylinder part 121 that protrudes inwardly from the housing 55 in an annular shape are provided on opposite sides of the outer annular protrusion 93 of the inner circumference of the housing 55. The inner annular protrusion 80 constitutes the tapered surface part 82 and the curved surface part 83. The cylinder part 121 constitutes the tip face part 122. The O-ring 59 and the O-ring 58 are interposed between the outer annular protrusion 93 and the inner annular protrusion 80 and between the outer annular protrusion 93 and the cylinder part 121, respectively.

The damping force varying mechanism 35 of the second embodiment is assembled by inserting the O-ring 59 into the housing body 54 up to the position of the curved surface part 83, fitting the free piston 57 into the inside of the housing body 54 and the O-ring 59, forcibly fitting the O-ring 58 between the free piston 57 and the housing body 54, fitting the cylinder part 121 between the free piston 57 and the housing body 54, and fixing the lid member 53 to the housing body 54.

The O-ring 58 disposed between the housing body 54 and the free piston 57 is disposed to seal between the housing 55 and the free piston 57, and always blocks the communication between an upper chamber communicating chamber 107 and a lower chamber communicating chamber 108.

In the damping force varying mechanism 35 of the second embodiment, as described above, the upper chamber communicating chamber 107 communicates with the back pressure chambers 225 of the damping force generation mechanism 31 via the passage holes 105 and 106. Accordingly, the oil flows from the upper chamber 12 in the cylinder 10 into the upper chamber communicating chamber 107 via the back pressure chamber inflow oil passages 226 and the back pressure chambers 225. Here, the back pressure chambers 225 are configured so that the pressure thereof is suppressed to low even when the pressure of the upper chamber 12 is raised, and becomes approximately a medium pressure between the pressure of the upper chamber 12 when raised and a pressure of the lower chamber 13 which is lowered at this time. This medium pressure is introduced into the upper chamber communicating chamber 107 of the damping force varying mechanism 35.

Further, in the damping force varying mechanism 35 of the second embodiment, the O-rings 58 and 59 located between the housing body 54 and the free piston 57 are positioned between the large-diameter cylindrical surface part 84 of the housing body 54 and the small-diameter cylindrical surface part 97 of the free piston 57 and between the large-diameter cylindrical surface part 84 of the housing body 54 and the small-diameter cylindrical surface part 133 of the free piston 57 at a neutral position of the free position 57.

For example, in the expansion stroke, when the free piston 57 moves from this neutral position toward the lower chamber 13 relative to the housing 55, the large-diameter cylindrical surface part 84 of the housing 55 and the small-diameter cylindrical surface part 97 of the free piston 57 mutually roll the O-ring 59, and move the O-ring 59 toward the lower chamber 13 relative to the housing 55, in the same way as the first embodiment. Afterwards, the curved surface part 83 and the tapered surface part 82 of the housing 55 on the side of the upper chamber 12 and the curved surface part 98 and the tapered surface part 99 of the free piston 57 on the side of the lower chamber 13 roll the O-ring 59, and simultaneously compress the O-ring 59 in axial and radial directions of the free piston 57. Then, the curved surface part 83 and the tapered surface part 82 of the housing 55 on the side of the lower chamber 13 and the curved surface part 98 and the tapered surface part 99 of the fret piston 57 on the side of the upper chamber 12 compress the O-ring 59 in the axial and radial directions of the free piston 57. Further, in the second embodiment, in the expansion stroke, when the free piston 57 moves from this neutral position toward the lower chamber 13 relative to the housing 55, the large-diameter cylindrical surface part 84 of the housing 55 and the small-diameter cylindrical surface part 133 of the free piston 57 mutually roll the O-ring 58, and move the O-ring 58 toward the lower chamber 13 relative to the housing 55.

In the following contraction stroke, when the free piston 57 moves toward the upper chamber 12 relative to the housing 55, the curved surface part 83 and the tapered surface part 82 of the housing 55 on the side of the lower chamber 13 and the curved surface part 98 and the tapered surface part 99 of the free piston 57 on the side of the upper chamber 12 release the compression of the O-ring 59, as in the first embodiment Then, the curved surface part 83 and the tapered surface part 82 of the housing 55 on the side of the upper chamber 12 and the curved surface part 98 and the tapered surface part 99 of the free piston 57 on the side of the lower chamber 13 roll the O-ring 59, and at the same time, further release the compression of the O-ring 59. Then, the large-diameter cylindrical surface part 84 of the housing 55 and the small-diameter cylindrical surface part 97 of the free piston 57 mutually roll the O-ring 59, and simultaneously move the O-ring 59 toward the upper chamber 12 relative to the housing 55. Further, in the second embodiment, in the contraction stroke, when the free piston 57 moves toward the upper chamber 12 relative to the housing 55, the large-diameter cylindrical surface part 84 of the housing 55 and the small-diameter cylindrical surface part 133 of the free piston 57 mutually roll the O-ring 58, and move the O-ring 58 toward the upper chamber 12 relative to the housing 55. Afterwards, the free piston 57 compresses the O-ring 58 in the axial and radial directions of the free piston 57 by means of the large-diameter cylindrical surface part 84 and the tip face part 122 of the housing 55 and the tapered surface part 131 and the curved surface part 132 of the free piston 57.

At this time, a region where the O-ring 58 is rolled between the large-diameter cylindrical surface part 84 of the housing 55 and the small-diameter cylindrical surface part 133 of the free piston 57 is a rolling region where the O-ring 58 is rolled at a position separated from a downstream side end within a moving region of the free piston 57. Further, at the position separated from the downstream side end, the rolling region is a moving region where the O-ring 58 moves in the moving direction of the free piston 57 in the state where the O-ring 58 is in contact with both the housing 55 and the free piston 57. The term "moving" is defined that at least a downstream end position (an upper end position in FIG. 4) of the O-ring 58 in the moving direction of the free piston is moved.

A region where the O-ring 58 is compressed between the tip face part 122 of the housing 55 and the curved surface part 132 and the tapered surface part 131 of the free piston 57 is a moving direction deformation region where the O-ring 58 undergoes elastic deformation in the moving direction of the free piston 57 on the downstream side end within the moving region of the free piston 57. The term "elastic deformation in the moving direction deformation region" is defined as deformation when an upstream end position (a lower end position in FIG. 4) of the O-ring 58 in the moving direction of the free piston is moved but a downstream end position is not changed. In this embodiment, the rolling region and the moving region are partially overlapped on the moving direction deformation region.

In the following expansion stroke, the tip face part 122 of the housing 55, and the tapered surface part 131 and the curved surface part 132 of the free piston 57 release the compression of the O-ring 58. The large-diameter cylindrical surface part 84 of the housing 55 and the small-diameter cylindrical surface part 133 of the free piston 57 mutually roll the O-ring 58, and move the O-ring 58 toward the lower chamber 13 relative to the housing 55. Similarly, in the case of the O-ring 59, the large-diameter cylindrical surface part 84 of the housing 55 and the small-diameter cylindrical surface part 97 of the free piston 57 mutually roll the O-ring 59, and move the O-ring 59 toward the lower chamber 13 relative to the housing 55. Thus, when the free piston 57 passes through its neutral position, it operates the O-rings 58 and 59 in the same way as described above.

According to the second embodiment described above, since the upper chamber communicating chamber 107 communicates with the back pressure chambers 225 of the damping force generation mechanism 31, the oil flows from the upper chamber 12 in the cylinder 10 into the upper chamber communicating chamber 107 via the back pressure chamber inflow oil passages 226 and the back pressure chambers 225 in the state where an increase in pressure is suppressed. Accordingly, the durability of the O-ring 58 is improved. Further, since the damping force varying mechanism 35 is not influenced by a change in the pressure of the upper and lower chambers 12 and 13 with respect to sudden operation of the piston, for instance when running over a protrusion or a pothole, the durability of the O-ring 58 is further improved.

Further, the axially opposite surfaces of the outer annular protrusion 93 provided on the outer circumference of the free piston 57 constitute the curved surface part 98 and the tapered surface part 99, and the tapered surface part 131 and the curved surface part 132, respectively. The inner annular protrusion 80 having the curved surface parts 83 and the tapered surface part 82 and the cylinder part 121 having the tip face part 122 are provided on opposite sides of the outer annular protrusion 93 of the inner circumference of the housing 55. The O-ring 58 and the O-ring 59 are interposed between the outer annular protrusion 93 and the cylinder part 121 and between the outer annular protrusion 93 and the inner annular protrusion 80, respectively. As such, it is possible to commonalize the O-rings 58 and 59.

[Third Embodiment]

Figure 5:
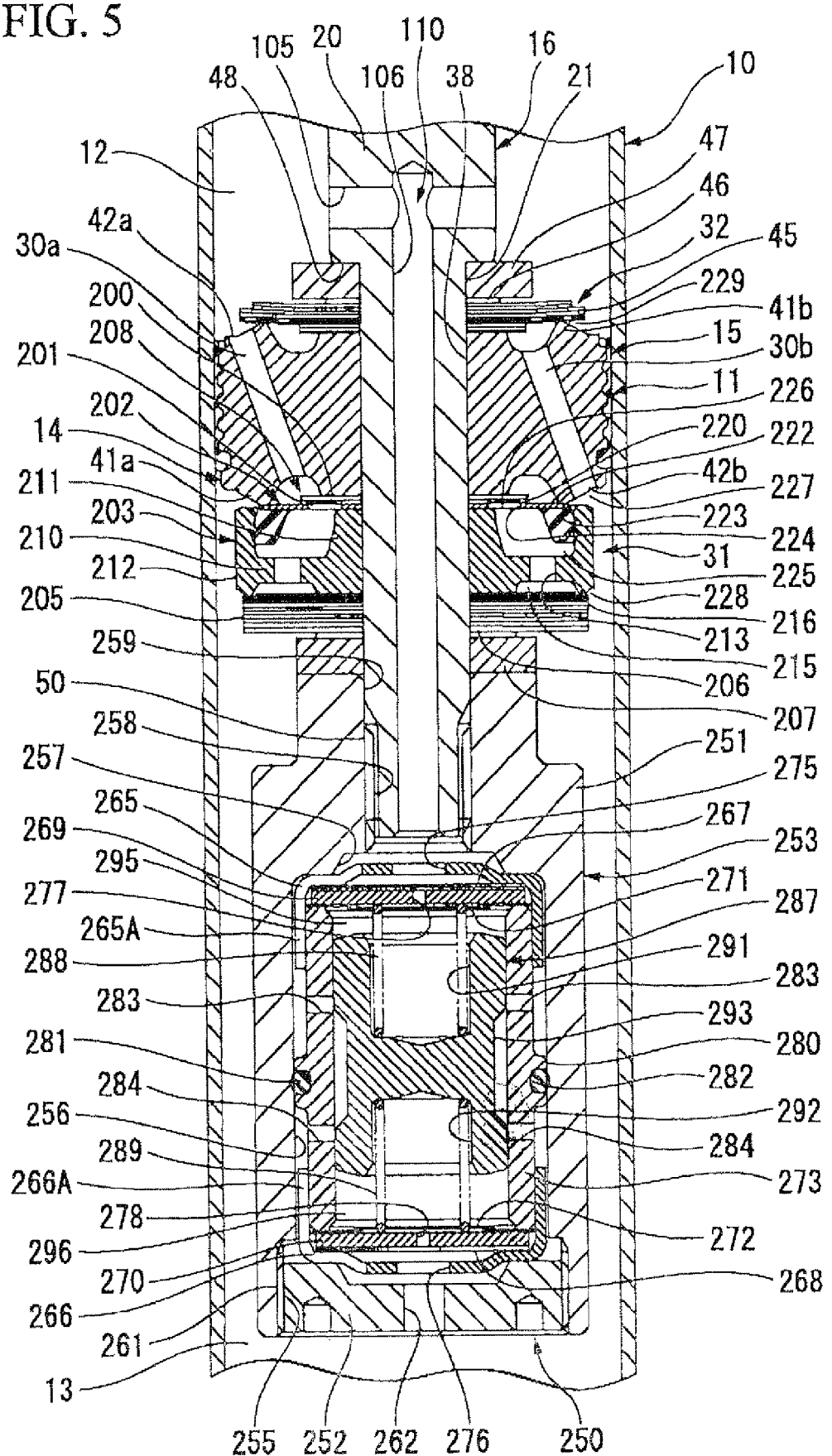
FIG. 5 is a cross-sectional view showing main parts of a shock absorber according to a third embodiment of the present invention.

Next, a third embodiment will be described focusing on portions different from those of the first and the second embodiments mainly based on FIG. 5. Further, for parts that are in common with the first embodiment, the same name and reference character are used.

In the third embodiment, a damping force varying mechanism 250 is provided, which is partially different from that of the first embodiment.

The damping force varying mechanism 250 of the third embodiment includes a housing 253, which is made up of a housing body 251 having an approximately cylindrical shape and a bottom lid member 252 attached to one end of the housing body 251 in an axial direction. The housing body 251 has a cylindrical shape. A female thread 255 up to which the bottom lid member 252 is screwed, a receiving hole part 256 having a smaller diameter than the female thread 255, a tapered hole 257 having a smaller diameter than the receiving hole part 256, a female thread 258 screwed up to a male thread 50 of a piston rod 16, and an attaching hole part 259 having a larger diameter than the female thread 258 are sequentially formed in an axial direction in the center of the housing body 251 starting from the attaching side of the bottom lid member 252. The bottom lid member 252 is provided with a male thread 261 on an outer circumferential surface thereof which is screwed up to the female thread 255. The bottom lid member 252 is provided with a communicating hole 262 in the center thereof which passes through in an axial direction.

The housing 253 includes: a pair of retainers 265 and 266 that are disposed in the receiving hole part 256 of the housing body 251, come into contact with a bottom surface of the receiving hole part 256 and an inner surface of the bottom lid member 252, and have a bottomed cylindrical shape; a pair of spacers 267 and 268 that are disposed inside the retainers 265 and 266, respectively; a pair of disc-shaped base plates 269 and 270 that are disposed on the opposite sides from the retainers 265 and 266 in axial directions of the spacers 267 and 268; a pair of leaf springs 271 and 272 that are disposed on the opposite sides from the spacers 267 and 268 in axial directions of the base plates 269 and 270 and have an approximately E shape; and a guide member 273 that is disposed between the leaf springs 271 and 272, holds the leaf springs 271 and 272 by means of the base plates 269 and 270, and has an approximately cylindrical shape.

The retainers 265 and 266 are provided with through-holes 275 and 276 in the centers of bottom parts thereof in an axial direction. Further, the retainers 265 and 266 are provided with slits 265A and 266A in lateral parts thereof extending from the bottom parts thereof into a radial gap between the guide member 273 and the housing body 251. The slits 265A and 266A extend in a radial direction, and then extend in an axial direction to exit on the opposite sides from the bottom parts of the retainers 265 and 266. The base plates 269 and 270 are provided with through-holes (orifices) 277 and 278 in the centers thereof in an axial direction. The spacers 267 and 268 are held between the retainers 265 and 266 and the base plates 269 and 270 in the state where the through-holes 275 and 276 of the retainers 265 and 266 can always communicate with the through-holes 277 and 278 of the base plates 269 and 270. The through-holes 277 and 278 have a smaller diameter than the through-holes 275 and 276.

The guide member 273 is provided with an annular protrusion part 280 that protrudes outwardly at a predetermined axial intermediate position. The protrusion part 280 is provided with an annular holding groove 282 in an outer circumference thereof which holds a seal ring 281 sealing a gap between the housing body 251 and the protrusion part 280. Further, the guide member 273 is provided with a plurality of through-holes 283 and a plurality of through-holes 284, both of which pass through in a radial direction, on axially opposite sides of the protrusion part 280.

The damping force varying mechanism 250 includes a free piston 287 that is fitted into the guide member 273 to be slidable in an axial direction of the guide member 273, and a pair of coil springs (resistance elements or elastic bodies) 288 and 289 that are disposed between the free piston 287 and the base plate 269 and between the free piston 287 and the base plate 270 respectively, maintain the free piston 287 at a neutral position, and generate resistance to displacement of the free piston 287. The free piston 287 is provided with a pair of spring holding holes 291 and 292 for holding the coil springs 288 and 289 on axially opposite sides thereof. Further, the free piston 287 is provided with an annular groove part 293 in an outer circumferential surface thereof which is radially recessed within a predetermined axial intermediate range. The groove part 293 switches communication and blockage with respect to the through-holes 283 and 284 according to a position of the free piston 287 relative to the guide member 273.

In the damping force varying mechanism 250 of the third embodiment, an upper chamber communicating chamber 295 is formed between the guide member 273, the free piston 287, and the base plate 269 on the side of the piston rod 16, and communicates with an upper chamber 12 via passage holes 105 and 106 of the piston rod 16, the through-hole 275 of the retainer 265 on the side of the piston rod 16, and the through-hole 277 of the base plate 269 on the side of the piston rod 16. Further, a lower chamber communicating chamber 296 is formed between the guide member 273, the free piston 287, and the base plate 270 on the opposite side from the piston rod 16, and communicates with a lower chamber 13 via the through-hole 278 of the base plate 270, the through-hole 276 of the retainer 266 on the opposite side from the piston rod 16, and the communicating hole 262 of the bottom lid member 252.

In the damping force varying mechanism 250 of the third embodiment, when the free piston 287 is located at its neutral position, the groove part 293 of the free piston 287 communicates with all of the through-holes 283 and 284 of the guide member 273 and the slits 265A and 266A of the retainers 265 and 266. As such, for example, in an expansion stroke, when the free piston 287 moves from its neutral position toward the lower chamber 13 relative to the housing 253, the free piston 287 stretches the coil spring 288 on the side of the upper chamber 12, and simultaneously contracts the coil spring 289 on the side of the lower chamber 13, thereby causing oil on the side of the upper chamber 12 to flow into the upper chamber communicating chamber 295. At this time, the free piston 287 causes the groove part 293 to close the through-holes 283 on the side of the upper chamber 12 and to communicate with only the through-holes 284 on the side of the lower chamber 13.

In the following contraction stroke, when the free piston 287 moves toward the upper chamber 12, the free piston 287 stretches the coil spring 289 on the side of the lower chamber, and simultaneously contracts the coil spring 288 on the side of the upper chamber 12, thereby causing oil on the side of the lower chamber 13 to flow into the lower chamber communicating chamber 296. At this time, the free piston 287 causes the groove part 293 to close the through-holes 284 on the side of the lower chamber and to communicate with only the through-holes 283 on the side of the upper chamber 12, after the groove part 293 has communicated with the through-holes 283 and 284 on axially opposite sides thereof.

In the following expansion stroke, when the free piston 287 moves toward the lower chamber 13 relative to the housing 253, the free piston 287 stretches the coil spring 288 on the side of the upper chamber 12, and simultaneously contracts the coil spring 289 on the side of the lower chamber 13. After the free piston 287 passes through its neutral position where the groove part 293 communicates with the through-holes 283 and 284 on the axially opposite sides thereof, the free piston 287 operates in the same way as described above.

According to the third embodiment described above, since the free piston 287 is configured to be biased by the coil springs 288 and 289, the durability is expected to be longer.

[Fourth Embodiment]

Figure 6:
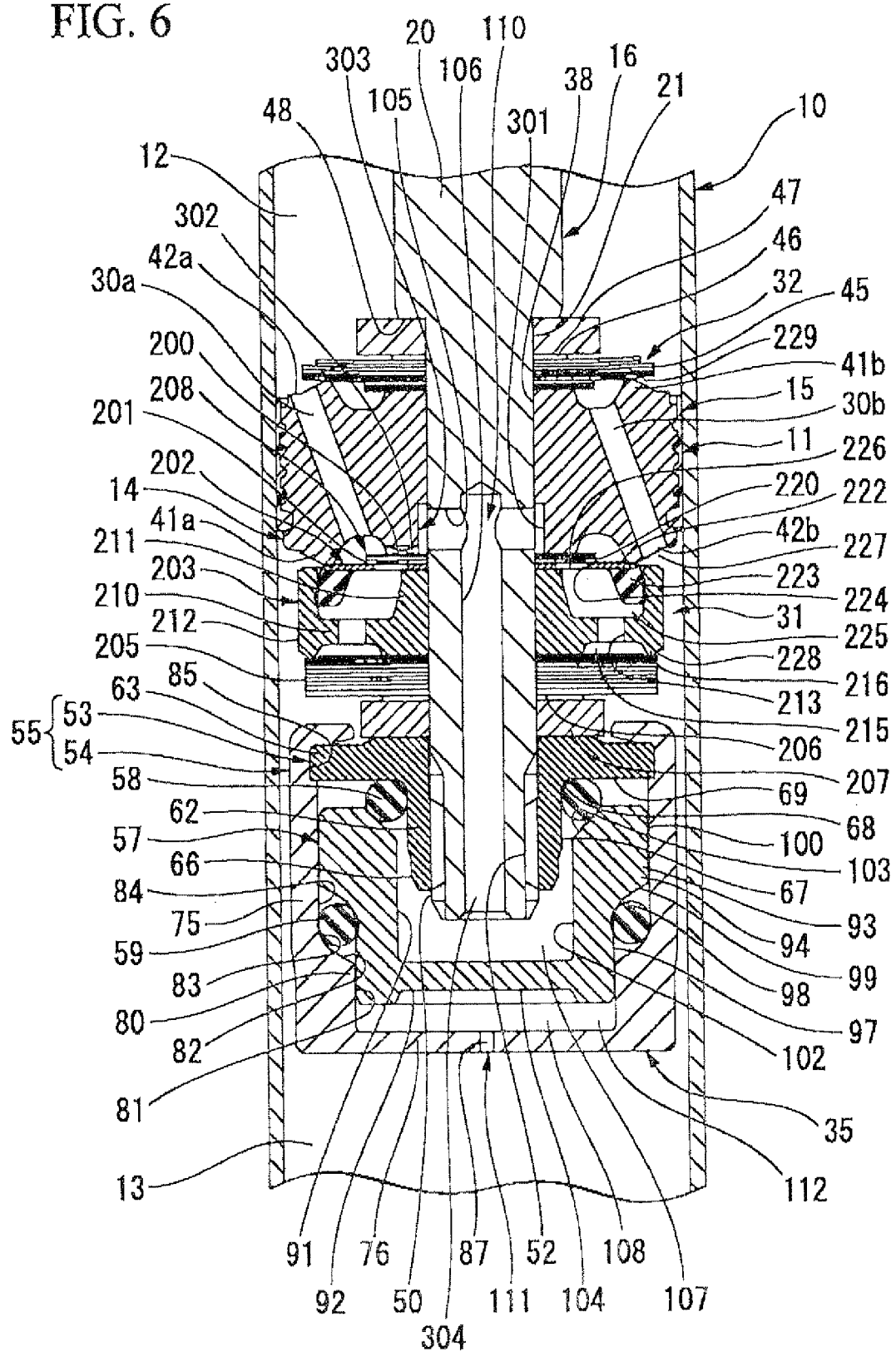
FIG. 6 is a cross-sectional view showing main parts of a shock absorber according to a fourth embodiment of the present invention.

Next, a fourth embodiment will be described focusing on portions different from those of the first embodiment mainly based on FIG. 6. Further, for parts that are in common with the first embodiment, the same name and reference character are used.

In the fourth embodiment, a piston 11 and a piston rod 16 are partially different from those of the first embodiment. That is, the piston 11 of the fourth embodiment is provided with large-diameter holes 301, which have a larger diameter than an insertion hole 38, on the side of the damping force generation mechanism 31 of the insertion hole 38 of a piston body 14. Further, the piston body 14 is provided with passage grooves 302, which connect the passages 30a and the large-diameter hole 301 to each other, radially inside the passages 30a of an end face of the damping force generation mechanism 31 so as to pass through in a radial direction. The passage grooves 302 are formed by a coining performed when the piston body 14 is formed. In contrast, the passage holes 105 formed in the piston rod 16 in a radial direction are flush with the large-diameter holes 301 of the piston 11 in an axial direction of the piston rod 16, and thus the axial passage hole 106 is formed with a short length.

The passage grooves 302 and the large-diameter holes 301 form piston branch-off passages 303 that branch off from the back pressure chamber inflow oil passages 226 and the passages 30a formed in the piston 11. The passage holes 105 and 106 formed in the piston rod 16 form a piston rod passage 304 communicating with the piston branch-off passages 303. When the piston 11 moves toward the upper chamber 12, the oil from one chamber, i.e. the upper chamber 12, in the cylinder 10 flows out from the passages 30a formed in the piston 11 toward the upper chamber communicating chamber 107 via the piston branch off passages 303 and the piston rod passage 304. Accordingly, the piston branch-off passages 303 and the piston rod passage 304 constitute a part of the passage 110 described above.

According to the fourth embodiment described above, the passage 110 is made up of the piston branch-off passages 303 branching off from the passages 30a formed in the piston 11, and the piston rod passage 304 formed in the piston rod 16. As such, it is possible to reduce a passage length of the passage hole 106 of the piston rod passage 304. Accordingly, it is possible to reduce passage resistance of the piston rod passage 304, and to easily obtain a desired damping force characteristic. Further, since the passage hole 106 of the piston rod passage 304 is formed by cutting, it is possible to reduce a cutting length, and thus to improve productivity. In addition, since a part of the piston branch-off passages 303 are formed by the passage grooves 302 of the end face of the piston 11, they can be formed in the piston 11 by coining, which leads to excellent productivity. Further, if a passage area of each passage groove 302 is adjusted to function as an orifice, it is possible to eliminate the communicating hole 87 constituting the orifice.

[Fifth Embodiment]

Figure 7:
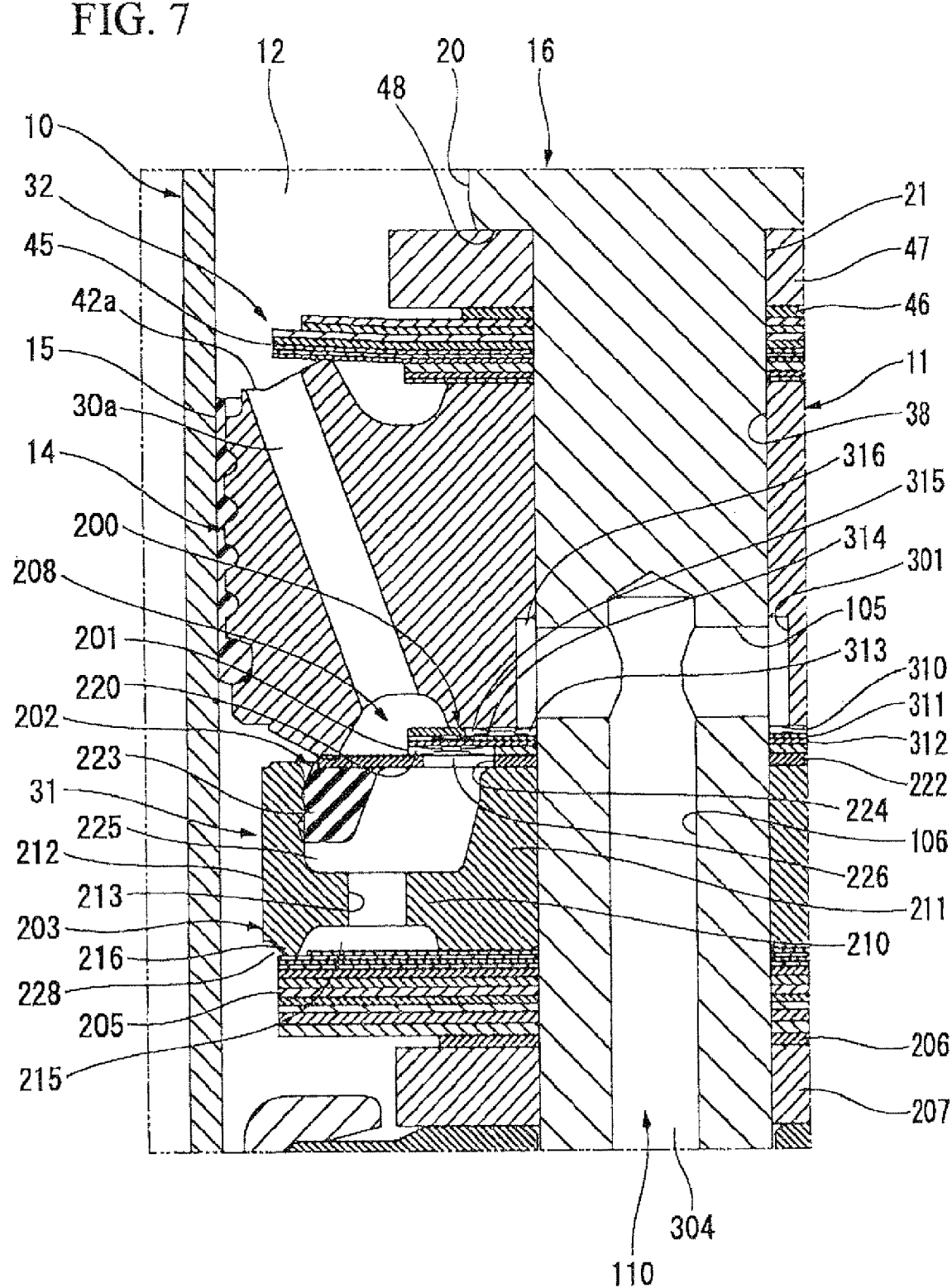
FIG. 7 is a cross-sectional view showing main parts of a shock absorber according to a fifth embodiment of the present invention.

Next, a fifth embodiment will be described focusing on portions different from those of the fourth embodiment mainly based on FIG. 7. Further, for parts that are in common with the fourth embodiment, the same name and reference character are used.

In the fifth embodiment, a piston 11 and a damping valve 208 are partially different from those of the fourth embodiment. That is, the piston 11 of the fifth embodiment is configured so that a piston body 14 thereof is provided with large-diameter holes 301 that are the same as the fourth embodiment, but not passage grooves 302 of the fourth embodiment. Further, a disc 200 constituting the damping valve 208 is made up of three single-plate discs 310 to 312, which have the same inner and outer diameters and a bored disc shape. The single-plate disc 310 on the side nearest to the piston 11 is provided with notch parts 313 on the inner diameter side thereof. The single-plate disc 311 adjacent to the single-plate disc 310 is provided with notch parts 314 on the outer diameter side thereof. These notch parts 313 and 314 are aligned in radial and circumferential directions, and always communicate with one another. Thus, the notch parts 314 of the single-plate disc 311 always communicate with the passages 30a, and the notch parts 313 of the single-plate discs 310 always communicate with the large-diameter holes 301. As such the passages 30a always communicate with the large-diameter holes 301 via the notch parts 313 and 314. Further, the single-plate disc 312 on the opposite side of the single-plate disc 311 from the single-plate disc 310 has no notch part.

The notch parts 313 and 314 are formed in the damping valve 208, thereby forming valve branch-off passages 315 that branch off from the back pressure chamber inflow oil passages 226 and the passages 30a. The large-diameter holes 301 are formed in the piston 11, thereby forming piston communicating passages 316 that communicate with the valve branch-off passages 315. When the piston 11 moves toward the upper chamber 12, the oil from one chamber, i.e. the upper chamber 12, in the cylinder 10 flows out from the passages 30a formed in the piston 11 via the valve branch-off passages 315, the piston passages 316, and the piston rod passage 304. Accordingly, the valve branch-off passages 315, the piston communicating passages 316, and the piston rod passage 304 constitute a part of the passage 110 described above.

According to the fifth embodiment described above, the passage 110 is made up of the valve branch-off passages 315 that are formed in the damping valve 208 and branch off from the passages 30a, the piston communicating passages 316 that are formed in the piston 11 and communicate with the valve branch-off passages 315, and the piston rod passage 304 that is formed in the piston rod 16 and communicates with the piston communicating passages 316. As such, like the fourth embodiment, it is possible to reduce the length of the passage hole 106 of the piston rod passage 304. Accordingly, it is possible to reduce the passage resistance of the piston rod passage 304. Further, since the passage hole 106 of the piston rod passage 304 is formed by cutting, it is possible to reduce a cutting length, and thus to improve productivity. In addition, since the valve branch-off passages 315 are allowed to change their flow passage areas by exchanging the single-plate discs 310 and 311 constituting the damping valve 208, the flow passage area of the passage 110 can be easily adjusted.

[Sixth Embodiment]

Next, a sixth embodiment will be described focusing on portions different from those of the second embodiment mainly based on FIG. 8. Further, for parts that are in common with the second embodiment, the same name and reference character are used.

In the sixth embodiment, a damping force generation mechanism 31 is partially different from that of the second embodiment. That is, a valve member 203 of the damping force generation mechanism 31 is not provided with the communicating holes 241 and the communicating holes 242 of the second embodiment. The valve member 203 is provided with a large-diameter hole 321 having a slightly larger diameter than the side of a bottom part 210 on the side of the inner circumference of an inner cylindrical part 211 which is opposite to the bottom part 210, and communicating grooves 322 that are slightly recessed from an end face thereof and pass through in a radial direction on the opposite side of the bottom part 210 of the inner cylindrical part 211. The large-diameter hole 321 is aligned with passage holes 105 of a piston rod 16. Thereby, the large-diameter hole 321 and the passage grooves 322 constitute orifices 323 that are disposed between the upper chamber communicating chamber 107 of a pressure chamber 112 and back pressure chambers 225 and connect them to each other.

Further, in the sixth embodiment, a damping force varying mechanism 35 is partially different from that of the second embodiment. That is, a lid member 53 that is partially different from that of the second embodiment is used. This lid member 53 is configured so that a lid flange part 63 and a cylinder part 121 have the same outer diameter. Further, a small-diameter cylindrical surface part 326, a tapered surface part (an inclined surface) 327, and a curved surface part (an inclined surface) 328 are formed on an inner circumferential surface of the cylinder part 121 starting from the side of the lid flange part 63. A lid cylinder part 62 is provided with a chamfered part 329 in place of the step part 66 of the second embodiment.

Further, in the sixth embodiment, a housing body 54 that is partially different from that of the second embodiment is used. That is, the housing body 54 is configured so that the housing bottom part 76 including the communicating hole 87 constituting the orifice of the second embodiment is not provided, and a free piston 57 protrudes from the small-diameter cylindrical surface part 81 of a housing cylinder part 75. Further, a fitting cylindrical surface part 85 of the housing cylinder part 75 causes the lid flange part 63 and the cylinder part 121 of the lid member 53 to be fitted thereinto over its entire length. By fitting the lid flange part 63 and the cylinder part 121 into the fitting cylindrical surface part 85, the curved surface part 328 of the cylinder part 121 continues with the large-diameter cylindrical surface part 84 of the housing cylinder part 75 without a height difference. Further, the orifices 323 formed in the damping force generation mechanism 31 are substituted for the communicating hole 87 of the second embodiment.

In addition, in the sixth embodiment, a free piston 57 that is partially different from that of the second embodiment is used. The free piston 57 of the second embodiment is provided with a plurality of through-holes 330, which pass through an outer annular protrusion 93 in a radial direction, at an axial middle position of the outer annular protrusion 93.

The free piston 57 is slidably fitted in the large-diameter cylindrical surface part 84 of the housing body 54 at a large-diameter cylindrical surface part 100, and the small-diameter cylindrical surface part 81 of the housing body 54 at the small-diameter cylindrical surface part 97. In this state, a position of the tapered surface part 327 and a position of the curved surface part 328 of the cylinder part 121 of the lid member 53, and a position of the tapered surface part 131 and a position of the curved surface part 132 of the free piston 57 are superimposed on each other in radial directions thereof. That is, the tapered surface part 327 and the curved surface part 328 of the cylinder part 121 and the tapered surface part 131 and the curved surface part 132 of the free piston 57 are opposite to each other in a moving direction of the free piston 57.

Figure 8:
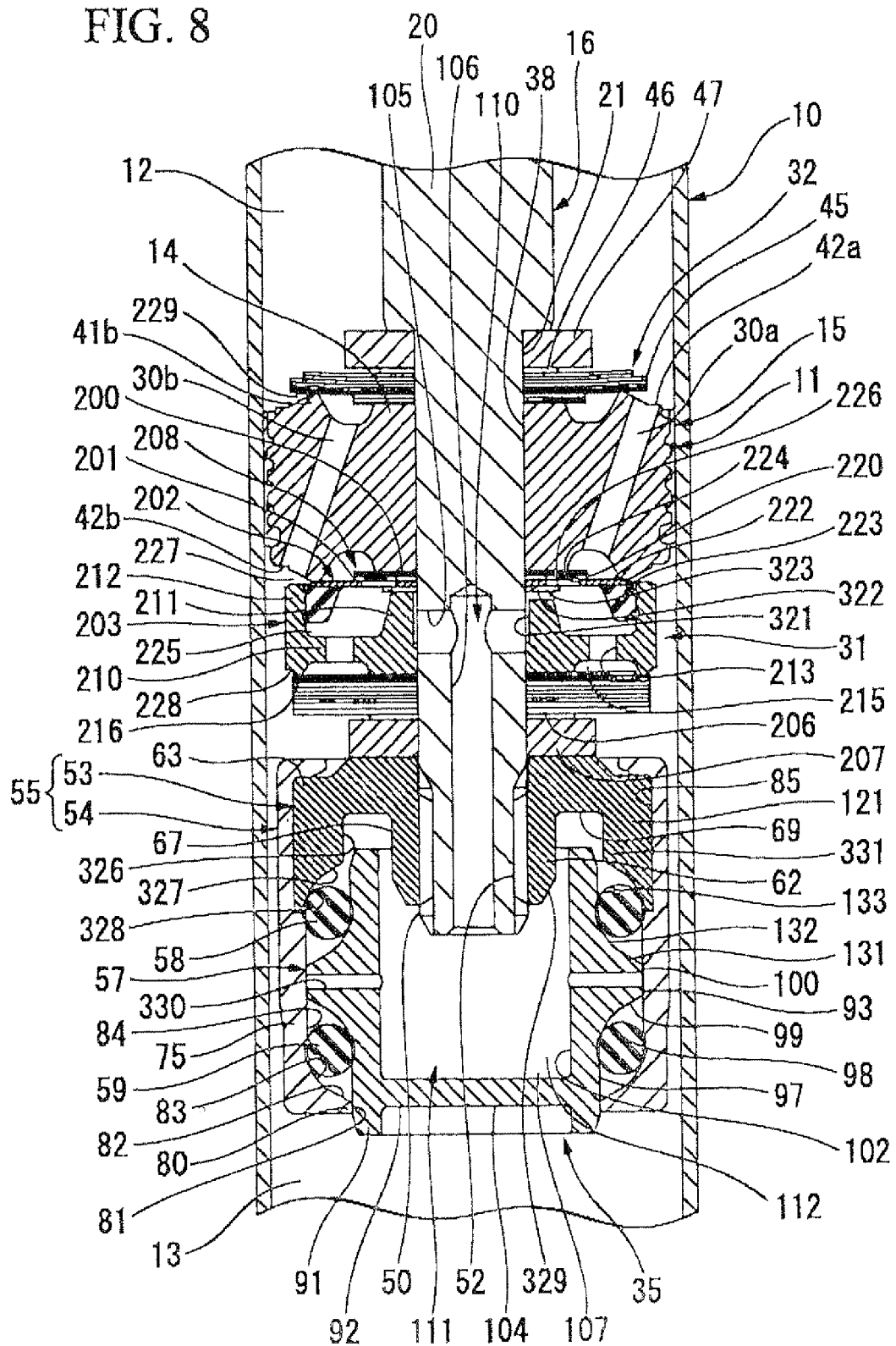
FIG. 8 is a cross-sectional view showing main parts of a shock absorber according to a sixth embodiment of the present invention.

Thus, in the sixth embodiment, an O-ring 58 (FIG. 8 shows a natural state) is disposed between the large-diameter cylindrical surface part 84 of the housing body 54, the tapered surface part 327 and the curved surface part 328 of the lid member 53, and the tapered surface part 131, the curved surface part 132 and the small-diameter cylindrical surface part 133 of the free piston 57. Like an O-ring 59, in a natural state, the O-ring 58 is configured to have a smaller inner diameter than the small-diameter cylindrical surface part 133 of the free piston 57 and a greater outer diameter than the large-diameter cylindrical surface part 84 of the housing body 54. That is, the O-ring 58 is also fitted in interference with both the free piston 57 and the housing 55 in a radial direction.

Both of the O-rings 58 and 59 have the same size. Both of the O-rings 58 and 59 maintain the free piston 57 within a predetermined neutral range with respect to the housing 55, and allow the free piston. 57 to axially move toward both of the axial upper and lower chambers 12 and 13 relative to the housing 55.

Accordingly, in the free piston 57 of the sixth embodiment, the O-ring 58 is in contact with the small-diameter cylindrical surface part 133, the curved surface part 132, and the tapered surface part 131. The curved surface part 132 and the tapered surface part 131 are inclined to the moving direction of the free piston 57. Further, in the housing 55, the O-ring 58 is in contact with the large-diameter cylindrical surface part 84, the tapered surface part 327, and the curved surface part 328.

The tapered surface part 327 and the curved surface part 328 are inclined to the moving direction of the free piston 57.

In other words, the outer annular protrusion 93 is formed on the outer circumference of the free piston 57. Axially opposite surfaces of the outer annular protrusion 93 constitute a curved surface part 98 and a tapered surface part 99, and the curved surface part 132 and the tapered surface part 131, respectively. An inner annular protrusion 80 constituting a tapered surface part 82 and a curved surface part 83 and an inner annular protrusion 331 constituting the tapered surface part 327 and the curved surface part 328 are provided on opposite sides of the outer annular protrusion 93 of the inner circumference of the housing 55. The O-ring 59 and the O-ring 58 are interposed between the outer annular protrusion 93 and the inner annular protrusion 80 and between the outer annular protrusion 93 and the inner annular protrusion 331, respectively.

Thus, in the damping force varying mechanism 35 of the sixth embodiment, as described above, the upper chamber communicating chamber 107 communicates with the back pressure chambers 225 of the damping force generation mechanism 31 via the passage holes 105 and 106 and the orifices 323. Accordingly, the oil flows from the upper chamber 12 in the cylinder 10 into the upper chamber communicating chamber 107 via the back pressure chamber inflow oil passages 226, the back pressure chambers 225, and the orifices 323. Here, the back pressure chambers 225 are configured so that the pressure thereof is suppressed to low even when the pressure of the upper chamber 12 is raised, and becomes approximately a medium pressure between the pressure of the upper chamber 12 when raised and a pressure of the lower chamber 13 which is lowered at this time. This medium pressure is introduced into the upper chamber communicating chamber 107 of the damping force varying mechanism 35.

Further, in the damping force varying mechanism 35 of the sixth embodiment, the O-rings 58 and 59 located between the housing body 54 and the free piston 57 are positioned between the large-diameter cylindrical surface part 84 of the housing body 54 and the small-diameter cylindrical surface part 97 of the free piston 57 and between the large-diameter cylindrical surface part 84 of the housing body 54 and the small-diameter cylindrical surface part 133 of the free piston 57 at a neutral position of the free position 57.

For example, in the expansion stroke, when the free piston 57 moves from this neutral position toward the lower chamber 13 relative to the housing 55, the large-diameter cylindrical surface part 84 of the housing 55 and the small-diameter cylindrical surface part 97 of the free piston 57 mutually roll the O-ring 59, and move the O-ring 59 toward the lower chamber 13 relative to the housing 55, in the same way as the second embodiment. Afterwards, the curved surface part 83 and the tapered surface part 82 of the housing 55 on the side of the upper chamber 12 and the curved surface part 98 and the tapered surface part 99 of the free piston 57 on the side of the lower chamber 13 roll the O-ring 59, and simultaneously compress the O-ring 59 in axial and radial directions of the free piston 57. Then, the curved surface part 83 and the tapered surface part 82 of the housing 55 on the side of the lower chamber 13 and the curved surface part 98 and the tapered surface part 99 of the free piston 57 on the side of the upper chamber 12 compress the O-ring 59 in the axial and radial directions of the free piston 57. Further, in the sixth embodiment as well, in the expansion stroke, when the free piston 57 moves from this neutral position toward the lower chamber 13 relative to the housing 55, the large-diameter cylindrical surface part 84 of the housing 55 and the small-diameter cylindrical surface part 133 of the free piston 57 mutually roll the O-ring 58, and move the O-ring 58 toward the lower chamber 13 relative to the housing 55.

In the following contraction stroke, when the free piston 57 moves toward the upper chamber 12 relative to the housing 55, the curved surface part 83 and the tapered surface part 82 of the housing 55 on the side of the lower chamber 13 and the curved surface part 98 and the tapered surface part 99 of the free piston 57 on the side of the upper chamber 12 release the compression of the O-ring 59, in the same way as the second embodiment. Then, the curved surface part 83 and the tapered surface part 82 of the housing 55 on the side of the upper chamber 12 and the curved surface part 98 and the tapered surface part 99 of the free piston 57 on the side of the lower chamber 13 roll the O-ring 59, and at the same time, further release the compression of the O-ring 59. Then, the large-diameter cylindrical surface part 84 of the housing 55 and the small-diameter cylindrical surface part 97 of the free piston 57 mutually roll the O-ring 59, and simultaneously move the O-ring 59 toward the upper chamber 12 relative to the housing 55. Further, in the sixth embodiment, at this time, in the case of the O-ring 58 as well, the large-diameter cylindrical surface part 84 of the housing 55 and the small-diameter cylindrical surface part 133 of the free piston 57 mutually roll the O-ring 58, and move the O-ring 58 toward the upper chamber 12 relative to the housing 55. Afterwards, the curved surface part 328 and, the tapered surface part 327 of the housing 55 on the side of the lower chamber 13 and the curved surface part 132 and the tapered surface part 131 of the free piston 57 on the side of the upper chamber 12 roll the O-ring 58, and simultaneously compress the O-ring 58 in the axial and radial directions of the free piston 57. Then, the curved surface part 328 and the tapered surface part 327 of the housing 55 on the side of the upper chamber 12 and the curved surface part 132 and the tapered surface part 131 of the free piston 57 on the side of the lower chamber 13 compress the O-ring 58 in the axial and radial directions of the free piston 57.

In the following expansion stroke, the curved surface part 328 and the tapered surface part 327 of the housing 55 on the side of the upper chamber 12 and the curved surface part 132 and the tapered surface part 131 of the free piston 57 on the side of the lower chamber 13 release the compression of the O-ring 58. Then, the curved surface part 328 and the tapered surface part 327 of the housing 55 on the side of the lower chamber 13 and the curved surface part 132 and the tapered surface part 131 of the free piston 57 on the side of the upper chamber 12 roll the O-ring 58, and at the same time, further release the compression of the O-ring 58. Then, the large-diameter cylindrical surface part 84 of the housing 55 and the small-diameter cylindrical surface part 133 of the free piston 57 mutually roll the O-ring 58, and move the O-ring 58 toward the lower chamber 13 relative to the housing 55. At this time, in the case of the O-ring 59 as well, the large-diameter cylindrical surface part 84 of the housing 55 and the small-diameter cylindrical surface part 97 of the free piston 57 mutually roll the O-ring 59, and move the O-ring 59 toward the lower chamber 13 relative to the housing 55. Thus, when the free piston 57 passes through its neutral position, the O-rings 58 and 59 operate in the same way as described above.

According to the sixth embodiment described above, since the orifices 323 are provided between the back pressure chambers 225 and the upper chamber communicating chamber 107 of the pressure chamber 112, the orifices for the pressure chamber 112 are also used as the orifices for the back pressure chambers 225. Accordingly, the housing bottom part for forming the orifices in the housing 55 is not required, and thus it is possible to reduce an entire length of the damping force varying mechanism 35.

[Seventh Embodiment]

Next, a seventh embodiment will be described focusing on portions different from those of the sixth embodiment mainly based on FIGS. 9 and 10. Further, for parts that are in common with the sixth embodiment, the same name and reference character are used.

In the seventh embodiment, a damping valve 208 made up of disc valves is partially different from that of the sixth embodiment. The damping valve 208 of the seventh embodiment includes a check valve disc (a shut valve) 340, a single-plate disc 341 and another single-plate disc 342, which are sequentially provided on the side of the valve member 203 of a damping valve body 202 starting from the side of the damping valve body 202. Further, the damping valve 208 includes a single-plate disc 345, another single-plate disc 346, a check valve disc (a second shut valve) 347, and a spacer 348, which are sequentially provided on the opposite side of the valve member 203 of the damping valve body 202 starting from the side of the damping valve body 202. Any of them has the shape of a bored disc through which the attaching shaft part 21 of a piston rod 16 is inserted.

A disc 222 of the damping valve body 202 is provided with a passage hole 349 inside and near an axial seal member 223. Further, the disc 222 is provided with a passage hole 350 farther inside the passage hole 349. The check valve disc 340 is configured so that its outer diameter is matched with an outer end of the passage hole 350 of the damping valve body 202. The check valve disc 340 is provided with a passage hole 351 at a radial middle position thereof in alignment with the passage hole 350 in radial and circumferential directions. The check valve disc 340 is provided so as to cover the passage hole 349 on an outer side thereof in an axial direction. The single-plate disc 341 has a smaller outer diameter than the check valve disc 340, and is provided with a notch part 352 on an outer diameter side thereof in partial superimposition on the passage hole 351 in radial and circumferential directions. The single-plate disc 342 has the same outer diameter as the single-plate disc 341, and is provided so as to cover the notch part 358 on an outer side thereof in an axial direction, The single-plate disc 342 comes into contact with the valve member 203.

The single-plate disc 345 has the same outer diameter as the check valve disc 340, and is provided with a notch part 354 on an outer diameter side thereof in alignment with the passage hole 349 in radial and circumferential directions. Further, the single-plate disc 345 is provided with a passage hole 355 at a radial middle position thereof in alignment with the passage hole 350 in radial and circumferential directions. The single-plate disc 346 has the same outer diameter as the single-plate disc 345. Further, the single-plate disc 346 is provided with a passage hole 356 at a radial middle position thereof in partial superimposition on the passage hole 355 in radial and circumferential directions. The check valve disc 347 has an outer diameter which is smaller than that of the single-plate disc 346 and which is larger than that of an outer end of the passage hole 356, and covers the passage hole 356. The spacer 348 has a smaller outer diameter than the check valve disc 347, and comes into contact with the piston 11.

Figure 9:
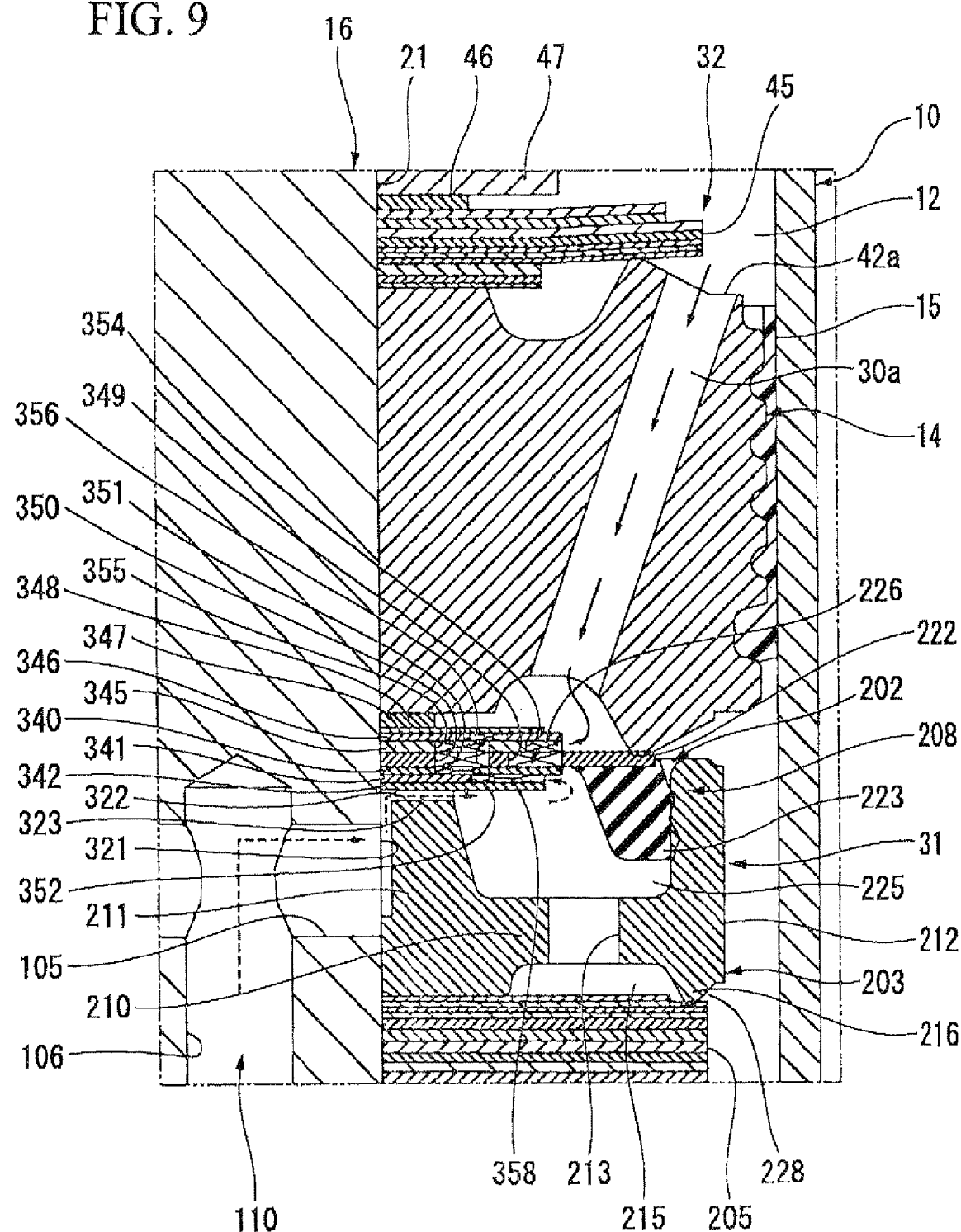
FIG. 9 is a cross-sectional view showing main parts of a shock absorber according to a seventh embodiment of the present invention.
Figure 10:
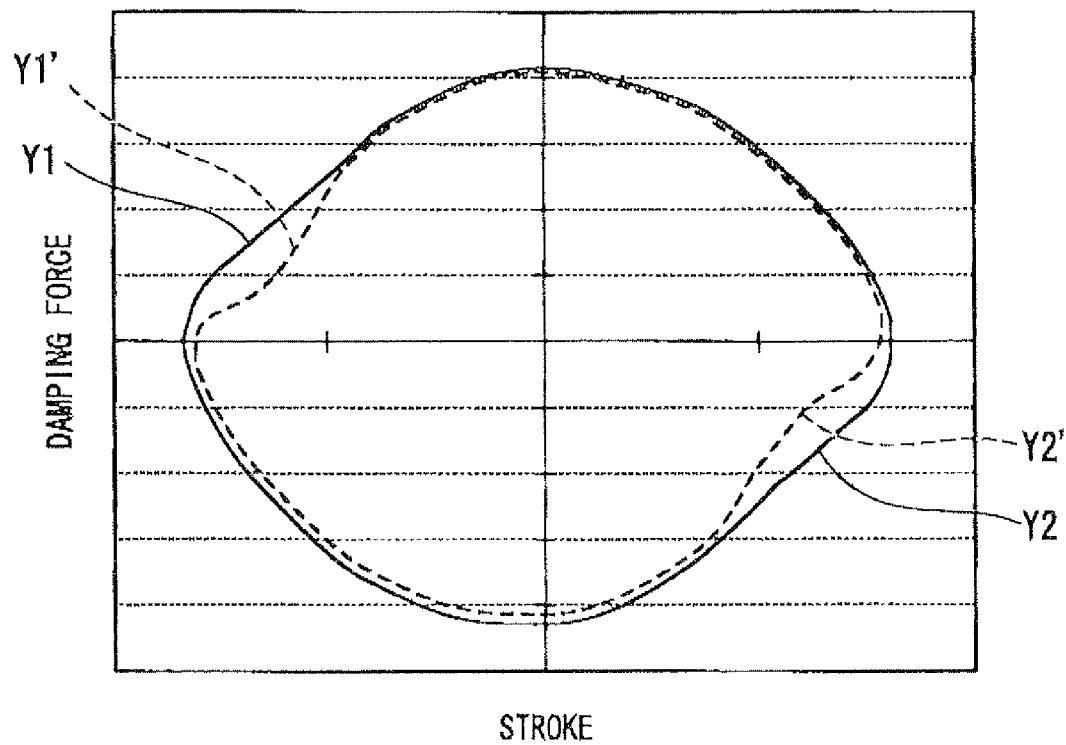
FIG. 10 is a characteristic diagram showing a relationship between a stroke and a damping force according to a seventh embodiment of the present invention.

The notch part 354 of the single-plate disc 345 and the passage hole 349 of the damping valve body 202, both of which are formed in the damping valve 208, always communicate with the upper chamber 12 via the passages 30a, and constitute the back pressure chamber inflow oil passage 226 that allows oil to flow from the upper chamber 12 into the back pressure chamber 225 in an expansion stroke as indicated in FIG. 9 by solid line arrows. The check valve disc 340 closes the back pressure chamber inflow oil passage 226, and is opened by deformation in a direction where the oil flows into the back pressure chamber 225 when a pressure of the back pressure chamber inflow oil passage 226 is higher than that of the back pressure chamber 225 by a predetermined value. When the check valve disc 340 is opened, the back pressure chamber inflow oil passage 226 is open to communicate with the back pressure chamber 225, so that the oil on the side of the upper chamber 12 is introduced into the back pressure chamber 225.

The notch part 352 of the single-plate disc 341, the passage hole 351 of the check valve disc 340, the passage hole 350 of the damping valve body 202, the passage hole 355 of the single-plate disc 345, and the passage hole 356 of the single-plate disc 346 always communicate with the back pressure chamber 225. These components are provided parallel to the back pressure chamber inflow oil passage 226, and constitute a back pressure chamber outflow oil passage 358 that allows oil to flow out from the back pressure chamber 225 into the upper chamber 12 in a contraction stroke as indicated in FIG. 9 by dashed line arrows. Thus, the check valve disc 347 closes the back pressure chamber outflow oil passage 358, and is opened by deformation in a direction where the oil flows out from the back pressure chamber 225 when the pressure of the back pressure chamber 225 is higher than that of the passage 30a by a predetermined value. When the check valve disc 347 is opened, the back pressure chamber outflow oil passage 358 is open to communicate with the upper chamber 12, so that the oil of the back pressure chamber 225 is discharged toward the upper chamber 12.

According to the seventh embodiment as described above, the check valve disc 340 is provided, which closes the back pressure chamber inflow oil passage 226 and is open in the inflow direction where the oil flows into the back pressure chamber 225. Further, the check valve disc 347 is provided, which closes the back pressure chamber outflow oil passage 358 and is open in the outflow direction where the oil flows out from the back pressure chamber 225. As such, it is possible to change a damping force more smoothly. That is, when the check valve discs 340 and 347 are not provided, as indicated in FIG. 10 by a dashed line, just after a stroke is switched from a contraction side to an expansion side, and from an expansion side to a contraction side, areas Y1' and Y2' where the damping force is insufficient are generated. In contrast, the check valve discs 340 and 347 are provided, so that, as indicated in FIG. 10 by a solid line, it is possible to prevent the damping force from being insufficient as in areas Y1 and Y2 compared to the areas Y1' and Y2'. That is, just after the stroke of the shock absorber is switched from the contraction side to the expansion side, the check valve disc 340 temporarily closes the back pressure chamber inflow oil passage 226, so that a flow of the oil that flows from the upper chamber 12 to the passage 30a, the back pressure chamber inflow oil passage 226, the back pressure chamber 225, the orifice 323, and the passage holes 105 and 106 is temporarily checked to generate the damping force (area Y1). Further, since the check valve disc 347 is provided, just after the stroke of the shock absorber is switched from the expansion side to the contraction side, the check valve disc 347 temporarily closes the back pressure chamber outflow oil passage 358, so that a flow of the oil that flows from the passage holes 105 and 106 to the upper chamber 12 via the orifice 323, the back pressure chamber 225, the back pressure chamber outflow oil passage 358, and the passage 30a is temporarily checked to generate the damping force (area Y2 indicated by a solid line).

Further, the damping valve 202 is configured as a disc valve, and the check valve discs 340 and 347 are provided to the disc valve. As such, it is possible to easily change the damping force characteristic by means of the check valve discs 340 and 347.

According to the embodiments described above, the shock absorber includes: a cylinder in which a working fluid is enclosed; a piston slidably fitted into the cylinder and configured to partition an interior of the cylinder into two chambers; a piston rod connected to the piston and configured to extend to an exterior of the cylinder; first and second passages to which the working fluid flows out from one of the chambers of the interior of the cylinder by movement of the piston; a damping valve installed on the first passage and configured to regulate a flow of the working fluid caused by sliding of the piston to generate a damping force; a back pressure chamber applying an internal pressure to the damping valve in a closing direction of the damping valve; a back pressure chamber inflow oil passage introducing the working fluid from the one of the chambers of the interior of the cylinder into the back pressure chamber; a pressure chamber provided on the second passage; and a free piston installed in the pressure chamber so as to freely slide in the pressure chamber. As such, in the region where the piston speed is fast, it is possible to suppress an increase in the damping force against an increase in the piston speed. Further, it is possible to lower the damping force when the frequency is high in the region where the piston speed is slow, and to raise the damping force when the frequency is low in the region where the piston speed is slow. Accordingly, it is possible to properly control the damping force in response to various vibrating states according to road surface conditions.

Further, the shock absorber includes a resistance element that generates resistance to displacement of the free piston. As such, it is possible to smoothly change the damping force when the damping force is changed in response to the frequency.

Further, the second passage is configured to guide the working fluid from one of the chambers of the interior of the cylinder into the pressure chamber via the back pressure chamber inflow oil passage and the back pressure chamber. As such, it is possible to use the second passage in common in the back pressure chamber inflow oil passage and the back pressure chamber.

The resistance element includes a coil spring. As such, it is expected to increase the durability of the resistance element generating resistance to the displacement of the free piston.

Further, the shock absorber includes a housing defining the pressure chamber, and an elastic body interposed between the housing and the free piston and configured to constitute the resistance element. As such, it is possible to seal between the housing and the free piston using the resistance element, and to reduce the number of components.

Further, the back pressure chamber includes a discharge orifice causing the working fluid of the back pressure chamber to flow out to a downstream side. As such, it is possible to control the pressure of the back pressure chamber by means of simple construction.

In addition, the back pressure chamber includes a discharge valve causing the working fluid of the back pressure chamber to flow out to a downstream side. As such it is possible to adequately release the pressure of the back pressure chamber.

Further, the shock absorber includes: a cylinder in which a working fluid is enclosed; a piston slidably fitted into the cylinder and configured to partition an interior of the cylinder into two chambers; a piston rod connected to the piston and configured to extend to an exterior of the cylinder; first and second passages to which the working fluid flows out from one of the chambers of the interior of the cylinder by movement of the piston; a damping valve installed on the first passage and configured to regulate a flow of the working fluid caused by sliding of the piston to generate a damping force; a back pressure chamber applying an internal pressure to the damping valve in a closing direction of the damping valve; a back pressure chamber inflow oil passage introducing the working fluid from the one of the chambers of the interior of the cylinder into the back pressure chamber; a housing in which a flow passage corresponding to at least a part of the second passage is formed; a free piston movably installed in the housing and configured to partition the second passage into an upstream side and a downstream side; and one or a plurality of elastic bodies interposed between the free piston and the housing. At least one of a free piston contact surface of the free piston with which the elastic body is in contact and a housing contact surface of the housing with which the elastic body is in contact includes an inclined surface that is inclined to a moving direction of the free piston, and a shortest distance between a portion that is in contact with the elastic body within the free piston contact surface and a portion that is in contact with the elastic body within the housing contact surface is changed by movement of the free piston. As such, in the region where the piston speed is fast, it is possible to suppress an increase in the damping force against an increase in the piston speed. Further, it is possible to lower the damping force when the frequency is high in the region where the piston speed is slow, and to raise the damping force when the frequency is low in the region where the piston speed is slow. Accordingly, it is possible to properly control the damping force in response to various vibrating states according to road surface conditions. Furthermore, it is possible to smoothly change the damping force when the damping force is changed in response to the frequency.

Further, the inclined surface of at least one of the free piston contact surface and the housing contact surface has a curved surface. As such, it is possible to change the damping force more smoothly.

The inclined surface of at least one of the free piston contact surface and the housing contact surface is adapted so that, when a shortest distance between a portion that is in contact with the elastic body within the free piston contact surface and a portion that is in contact with the elastic body within the housing contact surface becomes small, an inclined angle increases. As such, it is possible to change the damping force more smoothly.

The elastic bodies include one elastic body that undergoes compressive deformation when the free piston moves in one direction, and another elastic body that undergoes compressive deformation when the free piston moves in the other direction. As such, it is possible to smoothly change, the damping force in both the expansion stroke and the contraction stroke.

The free piston includes a flange part whose inner and outer circumferences serve as the inclined surface on one end thereof. The housing includes an extension part that extends into a cylinder part of the free piston at a part thereof. The one elastic body is disposed to come into contact with an inner circumferential surface of the flange part and the extension part, and the other elastic body is disposed to come into contact with an outer circumferential surface of the flange part and an inner circumferential surface of the housing. As such, the assembly efficiency of each component can be improved.

A free-piston-side annular protrusion is formed on the outer circumference of the free piston. Axially opposite surfaces of the free-piston-side annular protrusion constitute the free piston contact surface. Housing-side annular protrusions constituting the housing contact surface are provided on the opposite sides of the annular protrusion of the inner circumference of the housing. The elastic bodies are disposed between the free-piston-side annular protrusion and the housing-side annular protrusions. As such, it is possible to commonalize the elastic bodies.

Since the elastic body is rolled between the free piston and the housing, it is possible to change the damping force more smoothly.

The first and second passages are installed in the piston. As such, it is possible to simplify the construction.

At least one of the upstream side and the downstream side of the second passage includes an orifice. As such, it is possible to change the damping force more smoothly.

The first passage is formed in the piston, and the second passage includes a piston branch-off passage branching off from the first passage formed in the piston, and a piston rod passage formed in the piston rod. As such, it is possible to reduce a passage length of the piston rod passage. Accordingly, it is possible to reduce passage resistance of the piston rod passage. Further, when the piston rod passage is formed by cutting, it is possible to reduce a cutting length, and thus to improve productivity. In addition, since the piston branch-off passage can be formed in the piston by coining, the productivity is excellent.

The first passage is formed in the piston, and the second passage includes a piston branch-off passage formed in the damping valve, the piston branch-off passage being branched off from the first passage; and a piston rod passage formed in the piston rod. As such, it is possible to reduce a passage length of the piston rod passage. Accordingly, it is possible to reduce passage resistance of the piston rod passage. Further, when the piston rod passage is formed by cutting, it is possible to reduce a cutting length, and thus to improve productivity. In addition, since the valve branch-off passage is allowed to change its flow passage area by exchanging the damping valve, the flow passage area of the passage can be easily adjusted.

An orifice is formed between the back pressure chamber and the pressure chamber. As such, the orifice for the pressure chamber can be used as the orifice for the back pressure chamber.

The shock absorber includes a shut valve that closes the back pressure chamber inflow oil passage and opens the back pressure chamber inflow oil passage in an inflow direction to the back pressure chamber. As such, it is possible to change the damping force more smoothly.

A back pressure chamber outflow oil passage is provided parallel to the back pressure chamber inflow oil passage, and a second shut valve is provided which closes the back pressure chamber outflow oil passage and opens the back pressure chamber outflow oil passage in an outflow direction from the back pressure chamber. As such, it is possible to change the damping force more smoothly.

The damping valve is implemented as a disc valve, and the shut valve and the second shut valve are installed on the disc valve. As such, it is possible to easily change the damping force by exchanging the shut valve and the second shut valve.

Each of the aforementioned embodiments has shown an example where the present invention is used in a mono-tube type hydraulic shock absorber, but is not limited thereto. The present invention may be used in a double-tube type hydraulic shock absorber in which an outer barrel is installed on the outer circumference of a cylinder, and a reservoir is installed between the outer barrel and the cylinder, and may be used in all shock absorbers. Further, in the case of the double-tube type hydraulic shock absorber, a bottom valve communicating between a lower chamber and the reservoir is installed on the bottom of the cylinder, and the aforementioned housing is installed on the bottom valve. Thereby, the present invention can be applied to the bottom valve. Further, when an oil passage communicating with the cylinder is installed on an exterior of the cylinder, and a damping force generation mechanism is installed in the oil passage, the aforementioned housing is installed on the exterior of the cylinder. Further, while the embodiments have shown a hydraulic shock absorber by way of example, water or air may be used as a fluid.

Thus, in each embodiment, one or two O-rings have been shown by way of example. However, if necessary, three or more O-rings may be used on the basis of the same technical idea. Further, while each embodiment has shown an example where a ring formed of rubber (resin) is used as an elastic body, a plurality of balls formed of rubber may be provided at predetermined intervals in a circumferential direction. Further, the elastic body that can be used in the present invention may not be formed of rubber as long as it has elasticity in a plurality of axial directions rather than one axial direction.

While exemplary embodiments of the invention have been described and illustrated above, it should be understood that the invention is not limited to these embodiments. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A shock absorber comprising:
    a cylinder in which a working fluid is enclosed;
    a piston slidably fitted into the cylinder and configured to partition an interior of the cylinder into two chambers;
    a piston rod configured to pass through the piston and being connected to the piston, the piston rod being configured to extend to an exterior of the cylinder;
    a first passage provided on the piston and into which the working fluid flows from one of the chambers of the interior of the cylinder by movement of the piston;
    a second passage provided inside the piston rod and into which the working fluid flows from one of the chambers of the interior of the cylinder by movement of the piston
    a damping valve installed on the first passage and configured to regulate a flow of the working fluid caused by sliding of the piston to generate a damping force;
    a back pressure chamber applying an internal pressure to the damping valve in a closing direction of the damping valve;
    a back pressure chamber inflow oil passage introducing the working fluid from the one of the chambers of the interior of the cylinder into the back pressure chamber;
    a housing in which at least a part of the second passage is located, the housing being located at a side of the other of the chambers of the interior of the cylinder with respect to the piston;
    a pressure chamber located inside the housing; and
    a free piston movably installed in the pressure chamber, wherein the second passage is configured to guide the working fluid from one of the chambers of the interior of the cylinder into the pressure chamber via a branch-off passage that branches off from the first passage and connects with the second passage provided inside the piston rod.

2. The shock absorber according to claim 1, further comprising a resistance element that generates resistance to displacement of the free piston.

3. The shock absorber according to claim 2, wherein the resistance element includes a coil spring.

4. The shock absorber according to claim 2, wherein an elastic body interposed between the housing and the free piston comprises the resistance element.

5. The shock absorber according to claim 1, wherein the branch-off passage is connected to the back pressure chamber inflow oil passage and the back pressure chamber.

6. The shock absorber according to claim 5, wherein an orifice is formed between the back pressure chamber and the pressure chamber.

7. The shock absorber according to claim 1, wherein the back pressure chamber includes a discharge orifice causing the working fluid of the back pressure chamber to flow out to a downstream side.

8. The shock absorber according to claim 1, wherein the back pressure chamber includes a discharge valve causing the working fluid of the back pressure chamber to flow out to a downstream side.

9. The shock absorber according to claim 1, wherein at least one of an upstream side and a downstream side of the second passage includes an orifice.

10. The shock absorber according to claim 1, further comprising a shut valve that closes the back pressure chamber inflow oil passage and opens the back pressure chamber inflow oil passage in a inflow direction to the back pressure chamber.

11. The shock absorber according to claim 1, wherein the branch-off passage is either a piston branch-off passage provided on an end face of the piston or a valve branch-off passage provided on a damping valve.

12. A shock absorber comprising:
    a cylinder in which a working fluid is enclosed;
    a piston slidably fitted into the cylinder and configured to partition an interior of the cylinder into two chambers;
    a piston rod configured to pass through the piston and being connected to the piston, the piston rod being configured to extend to an exterior of the cylinder;
    first and second passages provided on the piston and to which the working fluid flows out from the one of the chambers of the interior of the cylinder by movement of the piston;
    a damping valve installed on the first passage and configured to regulate a flow of the working fluid caused by sliding of the piston to generate a damping force;
    a back pressure chamber applying an internal pressure to the damping valve in a closing direction of the damping valve;
    a back pressure chamber inflow oil passage introducing the working fluid from the one of the chambers of the interior of the cylinder into the back pressure chamber;
    a housing in which a flow passage corresponding to at least a part of the second passage is formed;
    a free piston movably installed in the housing and configured to partition the second passage into an upstream side and a downstream side; and
    one or a plurality of elastic bodies interposed between the free piston and the housing,
    wherein at least one of a free piston contact surface of the free piston with which the elastic body is in contact and a housing contact surface of the housing with which the elastic body is in contact includes an inclined surface that is inclined to a moving direction of the free piston, and a shortest distance between a portion that is in contact with the elastic body within the free piston contact surface and a portion that is in contact with the elastic body within the housing contact surface is changed by movement of the free piston.

13. The shock absorber according to claim 12, wherein the elastic bodies include one elastic body that undergoes compressive deformation when the free piston moves in one direction, and an other elastic body that undergoes compressive deformation when the free piston moves in the other direction.

14. The shock absorber according to claim 13, wherein the free piston includes a flange part whose inner and outer circumferences serve as the inclined surface on one end thereof, the housing includes an extension part that extends into a cylinder part of the free piston at a part thereof, the one elastic body is disposed to come into contact with an inner circumferential surface of the flange part and the extension part, and the other elastic body is disposed to come into contact with an outer circumferential surface of the flange part and an inner circumferential surface of the housing.

15. The shock absorber according to claim 12, wherein the second passage is configured to guide the working fluid from the one of the chambers of the interior of the cylinder into a pressure chamber via the back pressure chamber inflow oil passage and the back pressure chamber.

16. The shock absorber according to claim 12, wherein the inclined surface of at least one of the free piston contact surface and the housing contact surface has a curved surface.

17. The shock absorber according to claim 12, wherein the inclined surface of at least one of the free piston contact surface and the housing contact surface is adapted so that, when the shortest distance between a portion that is in contact with the elastic body within the free piston contact surface and a portion that is in contact with the elastic body within the housing contact surface becomes small, an inclined angle increases.

18. The shock absorber according to claim 12, wherein the elastic body is rolled between the free piston and the housing.

* * * * *